United States Patent
Li et al.

(10) Patent No.: US 11,269,431 B2
(45) Date of Patent: Mar. 8, 2022

(54) ELECTRONIC-SCRIBED INPUT

(71) Applicant: Nokia Technologies Oy, Espoo (FI)

(72) Inventors: Xiaoping Li, Beijing (CN); Bin Gao, Beijing (CN); Li Luo, Beijing (CN); Yuyang Liang, Beijing (CN)

(73) Assignee: NOKIA TECHNOLOGIES OY, Espoo (FI)

( * ) Notice: Subject to any disclaimer, the term of this patent is extended or adjusted under 35 U.S.C. 154(b) by 337 days.

(21) Appl. No.: 14/899,814

(22) PCT Filed: Jun. 19, 2013

(86) PCT No.: PCT/CN2013/077456
§ 371 (c)(1),
(2) Date: Dec. 18, 2015

(87) PCT Pub. No.: WO2014/201631
PCT Pub. Date: Dec. 24, 2014

(65) Prior Publication Data
US 2016/0139691 A1    May 19, 2016

(51) Int. Cl.
*G06F 3/038* (2013.01)
*G06F 3/0354* (2013.01)
(Continued)

(52) U.S. Cl.
CPC .......... *G06F 3/0383* (2013.01); *G06F 3/0304* (2013.01); *G06F 3/0346* (2013.01); *G06F 3/03545* (2013.01); *G06F 40/103* (2020.01); *G06F 40/171* (2020.01); *G06F 40/58* (2020.01); *G06K 9/00402* (2013.01); *G06T 11/20* (2013.01)

(58) Field of Classification Search
CPC .................................................. G06F 3/03545
See application file for complete search history.

(56) References Cited

U.S. PATENT DOCUMENTS

| | | | | |
|---|---|---|---|---|
| 4,751,741 | A * | 6/1988 | Mochinaga | G06K 9/24 178/19.01 |
| 6,130,666 | A * | 10/2000 | Persidsky | G06F 3/0354 178/19.01 |

(Continued)

FOREIGN PATENT DOCUMENTS

| | | |
|---|---|---|
| CN | 1372182 A | 10/2002 |
| CN | 101118471 A * | 2/2008 |

(Continued)

OTHER PUBLICATIONS

Norrie et al, Print N link: weaving the paper web, DocEng '06, 2006, 11 pages, (Year: 2006).*

(Continued)

*Primary Examiner* — Dorothy Harris
(74) *Attorney, Agent, or Firm* — Alston & Bird LLP

(57) ABSTRACT

An apparatus, the apparatus comprising at least one processor, and at least one memory including computer program code, the at least one memory and the computer program code configured, with the at least one processor, to cause the apparatus to perform at least the following: based on one or more determined input manner characteristics of user electronic-scribed input, associate the user electronic-scribed input with a function to be performed using the user electronic-scribed input.

8 Claims, 16 Drawing Sheets

(51) Int. Cl.
*G06F 3/03* (2006.01)
*G06F 3/0346* (2013.01)
*G06F 40/58* (2020.01)
*G06F 40/103* (2020.01)
*G06F 40/171* (2020.01)
*G06K 9/00* (2022.01)
*G06T 11/20* (2006.01)

(56) References Cited

U.S. PATENT DOCUMENTS

| | | | |
|---|---|---|---|
| 6,181,329 B1 * | 1/2001 | Stork | G06F 3/03545 178/19.01 |
| 6,340,979 B1 * | 1/2002 | Beaton | G06F 3/04883 715/764 |
| 6,422,775 B1 * | 7/2002 | Bramlett | B43K 29/08 382/188 |
| 6,831,632 B2 * | 12/2004 | Vardi | G06K 9/222 178/19.01 |
| 6,938,222 B2 * | 8/2005 | Hullender | G06F 3/04883 345/173 |
| 6,943,670 B2 * | 9/2005 | Liguori | B43K 29/007 340/321 |
| 6,956,564 B1 * | 10/2005 | Williams | G06F 3/03545 345/179 |
| 7,068,860 B2 * | 6/2006 | Kasabach | G06F 3/03545 382/314 |
| 7,176,896 B1 * | 2/2007 | Fahraeus | G06K 9/22 345/173 |
| 7,203,384 B2 * | 4/2007 | Carl | G06F 3/0325 382/188 |
| 8,922,530 B2 * | 12/2014 | Pance | G06F 3/03545 345/179 |
| 9,639,178 B2 * | 5/2017 | Amm | G06F 3/03545 |
| 2002/0027550 A1 * | 3/2002 | Frink | G06F 3/04883 345/179 |
| 2002/0040817 A1 * | 4/2002 | LeKuch | G06F 1/169 178/18.09 |
| 2002/0060665 A1 * | 5/2002 | Sekiguchi | G06F 3/0346 345/157 |
| 2002/0126105 A1 * | 9/2002 | O'Donnell, Jr. | G06F 3/03545 345/179 |
| 2002/0141643 A1 * | 10/2002 | Jaeger | G06F 3/0481 382/181 |
| 2004/0140964 A1 * | 7/2004 | Wang | G06F 3/03545 345/179 |
| 2005/0024346 A1 * | 2/2005 | Dupraz | G06F 3/03545 345/179 |
| 2005/0052700 A1 * | 3/2005 | Mackenzie | G06F 3/03545 358/1.18 |
| 2006/0018546 A1 * | 1/2006 | Lagardere | G06F 3/04883 382/186 |
| 2006/0125805 A1 * | 6/2006 | Marggraff | G06F 3/03545 345/179 |
| 2006/0209052 A1 * | 9/2006 | Cohen | G06F 3/04883 345/179 |
| 2006/0282575 A1 * | 12/2006 | Schultz | G06F 3/04883 710/62 |
| 2007/0097100 A1 * | 5/2007 | Marggraff | G06F 3/0227 345/179 |
| 2007/0114288 A1 * | 5/2007 | Sparzo | G06F 3/03548 235/472.03 |
| 2009/0167702 A1 | 7/2009 | Nurmi | |
| 2011/0164000 A1 | 7/2011 | Pance | |
| 2011/0298709 A1 * | 12/2011 | Vaganov | G06F 3/03545 345/158 |
| 2012/0206330 A1 | 8/2012 | Cao et al. | |
| 2012/0253699 A1 | 10/2012 | Kuno | |
| 2012/0263381 A1 * | 10/2012 | Yoshida | G06F 3/03545 382/189 |
| 2012/0331546 A1 | 12/2012 | Falkenburg et al. | |
| 2013/0113699 A1 * | 5/2013 | Lim | H04L 12/282 345/156 |
| 2013/0321352 A1 * | 12/2013 | Muto | G06F 3/0488 345/179 |
| 2014/0218343 A1 * | 8/2014 | Hicks | G06F 3/04883 345/179 |
| 2014/0253521 A1 * | 9/2014 | Hicks | G06F 3/03545 345/179 |

FOREIGN PATENT DOCUMENTS

| | | | | |
|---|---|---|---|---|
| CN | 101164054 | | 4/2008 | |
| CN | 101561725 | | 10/2009 | |
| CN | 101561725 A | * | 10/2009 | |
| CN | 101561725 A | | 10/2009 | |
| CN | 102981693 A | | 3/2013 | |
| WO | WO-0161454 A1 | * | 8/2001 | G06F 3/0317 |
| WO | WO-03058394 A2 | * | 7/2003 | G06F 1/1613 |
| WO | 2011/075113 A1 | | 6/2011 | |

OTHER PUBLICATIONS

Live scribe release notes downloaded from http://www.livescribe.com/en-us/release notes Sep. 11, 2018, 40 pages, (Year: 2018).*
Greenbaum, Mastering Paper and forms in the Information Lifecycle: the Smart Pen and Paper Alternative, 2012 15 pages, (Year: 2012).*
Livescribe Smartpen User Guide version 2.5 2010, 145 pages. (Year: 2010).*
Extended European Search Report received for corresponding European Patent Application No. 13887217.1, dated Dec. 2, 2016, 7 pages.
International Search Report and Written Opinion received for corresponding Patent Cooperation Treaty Application No. PCT/CN2013/077456, dated Mar. 20, 2014, 10 pages.
Office Action for corresponding Chinese Application No. 201380078387.6 dated Dec. 15, 2017, with English Summary, 10 pages.
Office Action for corresponding Chinese Application No. 201380078387.6 dated Oct. 15, 2018, with English Summary, 9 pages.
Office Action for corresponding Chinese Application No. 201380078387.6 dated Mar. 19, 2019.

* cited by examiner

602

604

702

704

802

800

800

804

800

806

800

808

3 seconds 3 seconds

ELECTRONIC-SCRIBED INPUT

RELATED APPLICATION

This application was originally filed as Patent Cooperation Treaty Application No. PCT/CN2013/077456 filed Jun. 19, 2013.

TECHNICAL FIELD

The present disclosure relates to user interfaces, associated methods, computer programs and apparatus. Certain disclosed examples may relate to portable electronic devices, for example so-called hand-portable electronic devices which may be hand-held in use (although they may be placed in a cradle in use). Such hand-portable electronic devices include so-called Personal Digital Assistants (PDAs), mobile telephones, smartphones and other smart devices, and tablet PCs.

The portable electronic devices/apparatus according to one or more disclosed examples may provide one or more audio/text/video communication functions (e.g. tele-communication, video-communication, and/or text transmission (Short Message Service (SMS)/Multimedia Message Service (MMS)/e-mailing) functions), interactive/non-interactive viewing functions (e.g. web-browsing, navigation, TV/program viewing functions), music recording/playing functions (e.g. MP3 or other format and/or (FM/AM) radio broadcast recording/playing), downloading/sending of data functions, image capture function (e.g. using a (e.g. in-built) digital camera), and gaming functions.

BACKGROUND

A user may use an electronic device for electronically-scribing input, for example by writing with a stylus on an electronic surface to enter handwritten text.

The listing or discussion of a prior-published document or any background in this specification should not necessarily be taken as an acknowledgement that the document or background is part of the state of the art or is common general knowledge. One or more examples of the present disclosure may or may not address one or more of the background issues.

SUMMARY

In a first example there is provided an apparatus comprising at least one processor and at least one memory including computer program code, the at least one memory and the computer program code configured to, with the at least one processor, cause the apparatus to perform at least the following: based on one or more determined input manner characteristics of user electronic-scribed input, associate the user electronic-scribed input with a function to be performed using the user electronic-scribed input.

The one or more determined input manner characteristics may be at least one of:
  a determined input plane of an electronic stylus during the scribing of the user electronic-scribed input;
  a determined input angle of an electronic stylus during the scribing of the user electronic-scribed input;
  a determined pressure applied when using an electronic stylus during the scribing of the user electronic-scribed input;
  a determined surface type on which the user electronic-scribed input is made;
  a determined size of the user electronic-scribed input; and
  a determined speed of the user electronic-scribed input.

The computer program code may be further configured to, with the at least one processor, cause the apparatus to perform at least one of determine, and receive an indication of:
  the input plane of the electronic stylus during the scribing of the user electronic-scribed input;
  the input angle of the electronic stylus during the scribing of the user electronic-scribed input;
  the pressure applied when using the electronic stylus during the scribing of the user electronic-scribed input;
  the surface type on which the user electronic-scribed input is made;
  the size of the user electronic-scribed input; and
  the speed of the user electronic-scribed input.

Example input planes of an electronic stylus are a horizontal tabletop and a vertical wall. Example input angles of an electronic stylus are close to 90°/upright, if the stylus is substantially normal to the plane on which the user is scribing, or a shallow angle such as between 20°-40° from the plane of the surface being scribed on. Example pressures are light pressure, where the user lightly scribes on a surface without pressing down, and heavy pressure, where the user applies pressure to push the electronic stylus on to the scribing surface. Example surfaces include wood (e.g., of a tabletop,), paper, air (if the stylus does not make contact with a solid surface), glass, and skin (if the user scribes on his palm, for example). A user may scribe large or small characters relative to a predetermined character scribing size. A user may scribe at a fast or slow speed relative to a predetermined scribing speed. In some examples, a combination of two or more determined input manner characteristics may be associated with a particular function. For example, if a user scribes on a horizontal glass tabletop the determined input manner characteristics may be a horizontal upwards-facing surface (the determined input plane) which is a glass surface (the surface type).

The input manner characteristics may be determined using one or more of the following devices comprised in an electronic stylus used by a user to scribe the user electronic-scribed input: an accelerometer; a gyroscope; a proximity sensor; a trackball; an optical camera; an infra-red camera; a microphone; and a pressure sensor. For example, the relative size and speed of scribed characters may be determined using data collected from an accelerometer in the electronic stylus. As another example, the surface type (e.g., wood, paper, air) may be determined using data collected from a microphone configured to detect the sound of the electronic stylus on the particular surface, and/or a camera configured to capture images of the surface being scribed upon.

The computer program code may be further configured, with the at least one processor, cause the apparatus to associate the user electronic-scribed input with the function to allow the user electronic-scribed input to be one or more of:
  included in a particular type of electronic document;
  included in a particular entry field of a particular application;
  identified with a particular language;
  included in a particular application from a plurality of applications of the same type;
  transmitted to a particular device;
  associated with a particular writing style; and
  associated with an electronic message for transmission using a particular network service card.

The computer program code may be further configured, with the at least one processor, cause the apparatus to perform one or more of:
inclusion of the user electronic-scribed input in the particular type of electronic document;
inclusion of the user electronic-scribed input in the particular entry field of a particular application;
identification of the user electronic-scribed input with a particular language;
identification of the user electronic-scribed input with a particular application from a plurality of applications of the same type;
inclusion of the user electronic-scribed input in a particular application from a plurality of applications of the same type;
transmission of the user electronic-scribed input to a particular device;
association of the user electronic-scribed input with a particular writing style; and
association of the user electronic-scribed input with an electronic message for transmission using a particular network service card.

A particular type of electronic document may be an e-mail, an SMS message, a word processing document, a note, or a drawing, for example. A particular entry field may be, for example, a search field of a searching application, a web-address field of a web-browser, or a status update field in a social media application. Identifying user-scribed electronic input with a particular language may allow for providing language assistance in the identified language, such as auto-correction, auto-completion, and spell-checking, for example. A particular application from a plurality of applications of the same type may be a particular e-mail application from a plurality of available e-mail applications of different providers, or a particular searching application from a selection of local and online searching applications. Transmission to a particular device may be transmission of the electronically scribed input to, for example, a smartphone, a laptop, a remote computer storage medium or "cloud" or an electronic whiteboard, for example. A particular writing style may comprise the electronically scribed input being processed for display in a particular font style, size, and colour, for example. Associating an electronic message with a particular network service card may be, for example, entering user scribed input entered in one particular manner in a message to be transmitted using a particular SIM card (such as a local network SIM card).

Allowing the user electronic-scribed input to be included in a particular type of electronic document may comprise including the user electronic-scribed input in one or more of: an e-mail, an SMS message, an MMS message, a chat message, a word processing document, an electronic note, a drawing, a spreadsheet, a database, a search field, a web address, and a social media post.

Allowing the user electronic-scribed input to be included in a particular entry field of a particular application may comprise including the user electronic-scribed input in one or more of: a search field (such as a search field of an internet searching application or local file explorer, for example); a web address field (such as a web address field of an internet web browser, for example); a social media post field (such as a microblog post in a blog post entry field or a status update in a status update field in a social media application), and a data input field (such as a name, title or address in an electronic form).

Identifying user-scribed electronic input with a particular language may comprise, for example, associating user-scribed text with language assistance in the identified language, such as auto-correction, auto-completion, and spell-checking.

Allowing the user electronic-scribed input to be included in a particular application from a plurality of applications of the same type may comprise identification of the user electronic-scribed input with one or more of: an e-mail application type, a productivity application type, a messaging application type, a calendar application type, a web browsing application type, a social media application type, and a searching application type.

A particular e-mail application from a plurality of e-mail-type applications may be an e-mail application associated with a particular e-mail service provider (and may be a locally stored/operating or internet/cloud based e-mail type application for example). A productivity application may be a word processor, spreadsheet, database, or presentation preparation application, for example. A messaging application may be an SMS, MMS, or chat message application, for example. A particular calendar application from a plurality of calendar-type applications may be a particular internet-based calendar application of a plurality of different internet-based and locally stored calendar applications. A particular searching application from a plurality of searching-type applications may be a preferred searching application from a selection of local and/or online searching applications.

Allowing the user electronic-scribed input to the transmitted to a particular device may be transmission of the electronically scribed input to, for example, a smartphone, a laptop, or an electronic whiteboard.

Allowing the user electronic-scribed input to be associated with a particular writing style may comprise association of the electronically scribed input with one or more of a particular: text style, text size, text formatting; and text colour, for example.

Associating an electronic message with a particular network service card may be, for example, converting user scribed input entered in one particular manner in a message to be transmitted using a particular Subscribe Identity Module (SIM) card (such as a local network SIM card) or international SIM card.

The apparatus may be configured to associate the determined input manner characteristic of a particular determined surface on which the user electronic-scribed input is made with including the user electronic-scribed input in a particular type of electronic document. Thus scribing on a plastic surface may include the scribed input with an e-mail message, for example.

The apparatus may be configured to associate the determined input manner characteristic of a particular determined input plane of an electronic stylus during the scribing of the user electronic-scribed input with transmitting the user electronic-scribed input to a particular device. Thus, scribing on a vertical plane/surface may include the scribed input on a laptop device, for example.

The user electronic-scribed input may be one or more of: handwritten phonetic text input; and handwritten graphical text input. Thus the input may be, for example, English or French text (phonetic text), Chinese characters or Japanese Kanji (graphical text).

The user electronic-scribed input may be user electronic-scribed handwritten text input, and the function to be performed may be performed using text represented by the user electronic-scribed handwritten text input. Thus, in the case of text input, it may be considered that the function is performed using the text represented by the user-scribed input.

The user electronic-scribed input may be a drawn picture image input, such as a cartoon, or a scientific diagram/ sketch.

The apparatus may be configured to decipher content of the user electronic-scribed input. For example, the apparatus may be configured to perform handwriting recognition of scribed phonetic and/or graphical text to decipher it.

The apparatus may be configured to perform at least one of: determination of the input manner characteristics of the user electronic-scribed input, and association of the function using the user electronic-scribed input.

The apparatus may be one or more of: an electronic stylus, a wand, a portable electronic device, a mobile phone, a smartphone, a tablet computer, a surface computer, a laptop computer, a personal digital assistant, a graphics tablet, a pen-based computer, a non-portable electronic device, a desktop computer, a monitor/display, a household appliance, a server, or a module for one or more of the same.

The electronic stylus may be the apparatus or may be comprised in the apparatus.

According to a further example, there is provided a computer program comprising computer program code, the computer program code being configured to perform at least the following: based on one or more determined input manner characteristics of user electronic-scribed input, associate the user electronic-scribed input with a function to be performed using the user electronic-scribed input.

According to a further example, there is provided a method, the method comprising: based on one or more determined input manner characteristics of user electronic-scribed input, associating the user electronic-scribed input with a function to be performed using the user electronic-scribed input.

According to a further example there is provided an apparatus comprising: means for associating the user electronic-scribed input with a function to be performed using the user electronic-scribed input based on one or more determined input manner characteristics of user electronic-scribed input.

The present disclosure includes one or more corresponding aspects, examples or features in isolation or in various combinations whether or not specifically stated (including claimed) in that combination or in isolation. Corresponding means and corresponding function units (e.g., input manner characteristic determiner, electronic-scribed input associator, electronic function associator, and function performer) for performing one or more of the discussed functions are also within the present disclosure.

A computer program may be stored on a storage media (e.g. on a CD, a DVD, a memory stick or other non-transitory medium). A computer program may be configured to run on a device or apparatus as an application. An application may be run by a device or apparatus via an operating system. A computer program may form part of a computer program product. Corresponding computer programs for implementing one or more of the methods disclosed are also within the present disclosure and encompassed by one or more of the described examples.

The above summary is intended to be merely exemplary and non-limiting.

BRIEF DESCRIPTION OF THE FIGURES

A description is now given, by way of example only, with reference to the accompanying drawings, in which.

DESCRIPTION OF EXAMPLES

Figure 1:
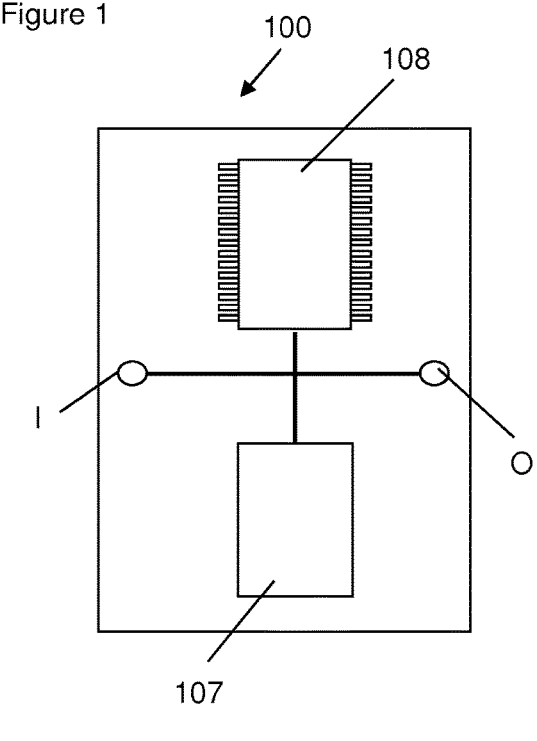
FIG. 1 illustrates an example apparatus example comprising a number of electronic components, including memory and a processor, according to one example of the present disclosure.

A user may use an electronic device for hand scribing input. For example, a user may scribe using an electronic stylus comprising sensors configured to detect the movement of the stylus. The detected movement may then be processed and converted into an electronic input, such as text or a picture.

For example, a user may hand-write a sentence using an electronic stylus, and the handwritten message may be detected and input to a device. The message may then be, for example, presented as an electronic representation of the user's handwriting, or may be converted using handwriting recognition into electronic characters/text. The entered characters/text may be re-formatted, for example to change the font size and style. The entered characters/text may be copied into an electronic document, such as a word processing document, e-mail or other message. As another example, a user may sketch a drawing using the electronic stylus and an electronic representation of the drawing may be made available on a device.

The electronic stylus may be a dedicated electronic pen configured for electronic scribing, or may be a device with electronic scribing and other functionality, such as a portable electronic device which provides mobile telephone communication functionality, internet access, and/or audio/video playback as well as electronic scribing functionality, for example. The electronic stylus may be any device with sensors (such as an accelerometer) configured to detect user-scribed input.

Entering text using an electronic stylus may require a certain amount of pre-planning. For example, if a user wishes to enter text into a messaging application, the user may be required to first open a messaging application and then select an option to compose a new message using electronic scribing before then beginning to write with the stylus.

Pre-planning and pre-configuring a device so that the electronically scribed input is handled as required may be inconvenient for a user. The user's train of thought may be lost between deciding to write and configuring a device to receive and handle the electronically scribed input. One of the benefits of being able to handwrite using an electronic stylus would be allowing a user to simply pick up a stylus and quickly write/draw without needing to manipulate a touch sensitive screen or other user interface of a device so that the scribed input is processed as required. This benefit is not available if the user is required to set-up a device for receiving the scribed input as the user intends before beginning to scribe.

A user may scribe using a device and the scribed user input may be recorded for use by the same device. The user may wish to enter scribed input to a scribing device having a minimal user interface. For example, the user may wish to enter the scribed input into a particular application running on the scribing device which does not have, for example, a (e.g., touch sensitive) screen, or a keyboard/buttons. Such a device may be, for example, a mobile communications device which is relatively small, (for increased portability). It may be difficult for a user to configure such a small device to receive and handle user electronically-scribed text. There is unlikely to be room for a physical or virtual keyboard on the device which can be easily used for typing, and a display screen of such a device may be so small that only a limited number of graphical user interface icons/options can be displayed on the screen at any time. The device may not even have a touch-sensitive screen. In such cases, the steps required to configure the device to receive and handle subsequent user scribed input may be difficult and not obvious for a user, and thus configuring the device to receive and handle scribed input may break the user's flow between deciding to scribe and being able to start scribing after configuring the device for input receipt. The benefits of being able to quickly pick up and write are lost due to challenges in configuring the device to accept scribed input.

One or more examples disclosed here provide for, when a user electronically scribes, the functions performed on the scribed input (e.g., text/drawings) to be dependent upon the manner in which the text/drawings are scribed. In this way, the manner/context/surrounding area of the device used for electronic scribing can be accounted for, as if it is a part of the user interface of the device.

Examples described herein may provide a user with a quick and natural way to launch an application and enter text/images into the application via scribing. The particular application may not need to be pre-configured to accept subsequent electronically scribed input. Thus, for example, a user may not need to manually search for and select an application in which he wants the electronically scribed input to be available, because the appropriate application may be automatically opened and configured to receive the electronically scribed input based on the manner in which the user makes the input. As another example, the user may not need to configure an application to format the electronically scribed input in a particular way because the formatting may automatically be performed based on the manner in which the electronically scribed input is made.

Performing a particular function on electronically scribed input dependent on the manner in which the input is made may provide the user with an intuitive and automatic process for entering electronically scribed input. This may save time and effort for the user who may not need to search and pre-configure a particular application or application settings for handling the electronically scribed input. Certain examples may be useful for small mobile apparatus/devices with small displays, since the user interface of the device may be considered to extend to the environment surrounding the device. The user interface may be considered to be present both inside and outside the device, so the user interface of a small apparatus/device is not necessarily limited by the device size.

It may be possible to produce electronic devices, such as mobile telephones, with a variety of different form factors which can be used for electronic scribing, because a user may not need to rely so heavily on being able to make user inputs to configure the device for handling scribed input via a relatively large touch-sensitive screen, for example. The device and applications may be set-up based on the manner in which electronically scribed input is made.

Other examples depicted in the figures have been provided with reference numerals that correspond to similar features of earlier described examples. For example, feature number 100 can also correspond to numbers 200, 300 etc. These numbered features may appear in the figures but may not have been directly referred to within the description of these particular examples. These have still been provided in the figures to aid understanding of the further examples, particularly in relation to the features of similar earlier described examples.

FIG. 1 shows an apparatus 100 comprising memory 107, a processor 108, input I and output O. In this example only one processor and one memory are shown but it will be appreciated that other examples may utilise more than one processor and/or more than one memory (e.g. same or different processor/memory types).

In this example the apparatus 100 is an Application Specific Integrated Circuit (ASIC) for a portable electronic device with a touch sensitive display. In other examples the apparatus 100 can be a module for such a device, or may be the device itself, wherein the processor 108 is a general purpose CPU of the device and the memory 107 is general purpose memory comprised by the device. The display, in other examples, may not be touch sensitive.

The input I allows for receipt of signalling to the apparatus 100 from further components, such as components of a portable electronic device (like a touch-sensitive or hover-sensitive display) or the like. The output O allows for onward provision of signalling from within the apparatus 100 to further components such as a display screen, speaker, or vibration module. In this example the input I and output O are part of a connection bus that allows for connection of the apparatus 100 to further components.

The processor 108 is a general purpose processor dedicated to executing/processing information received via the input I in accordance with instructions stored in the form of computer program code on the memory 107. The output signalling generated by such operations from the processor 108 is provided onwards to further components via the output O.

The memory 107 (not necessarily a single memory unit) is a computer readable medium (solid state memory in this example, but may be other types of memory such as a hard drive, ROM, RAM, Flash or the like) that stores computer program code. This computer program code stores instructions that are executable by the processor 108, when the program code is run on the processor 108. The internal connections between the memory 107 and the processor 108 can be understood to, in one or more examples, provide an active coupling between the processor 108 and the memory 107 to allow the processor 108 to access the computer program code stored on the memory 107.

In this example the input I, output O, processor 108 and memory 107 are all electrically connected to one another internally to allow for electrical communication between the respective components I, O, 107, 108. In this example the components are all located proximate to one another so as to be formed together as an ASIC, in other words, so as to be integrated together as a single chip/circuit that can be installed into an electronic device. In other examples one or more or all of the components may be located separately from one another.

Figure 2:
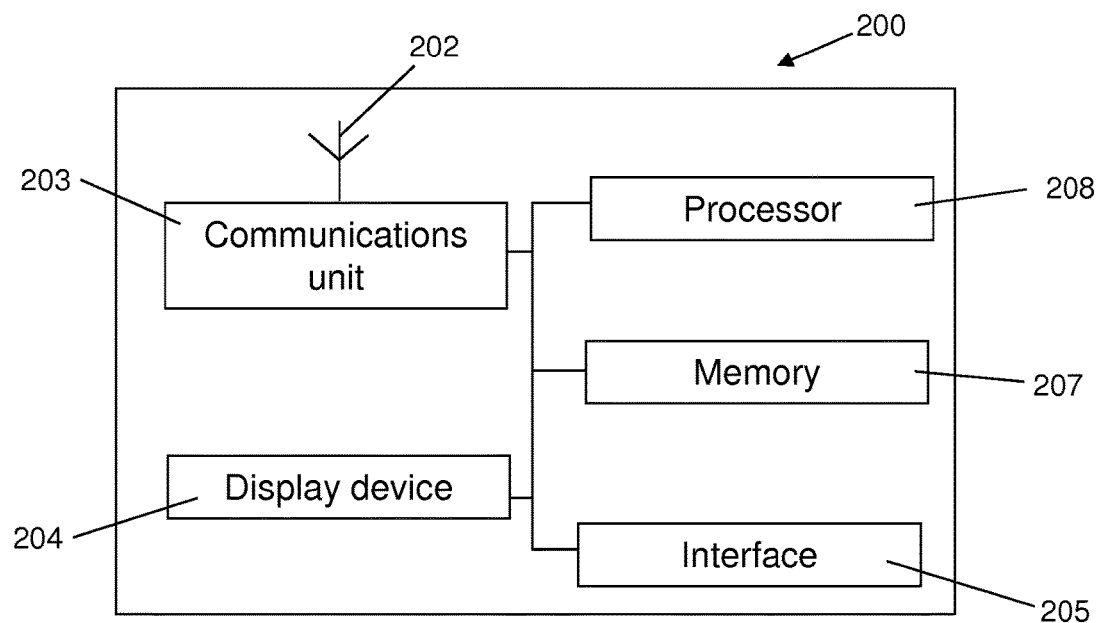
FIG. 2 illustrates an example apparatus example comprising a number of electronic components, including memory, a processor and a communication unit, according to another example of the present disclosure.

FIG. 2 depicts an apparatus 200 of a further example, such as a mobile phone. In other examples, the apparatus 200 may comprise a module for a mobile phone (or PDA or audio/video player), and may just comprise a suitably configured memory 207 and processor 208.

The example of FIG. 2 comprises a display device 204 such as, for example, a liquid crystal display (LCD), e-Ink or touch-screen user interface. The apparatus 200 of FIG. 2 is configured such that it may receive, include, and/or otherwise access data. For example, this example 200 comprises a communications unit 203, such as a receiver, transmitter, and/or transceiver, in communication with an antenna 202 for connecting to a wireless network and/or a port (not shown) for accepting a physical connection to a network, such that data may be received via one or more types of networks. This example comprises a memory 207 that stores data, possibly after being received via antenna 202 or port or after being generated at the user interface 205. The processor 208 may receive data from the user interface 205, from the memory 207, or from the communication unit 203. It will be appreciated that, in certain examples, the display device 204 may incorporate the user interface 205. Regardless of the origin of the data, these data may be outputted to a user of apparatus 200 via the display device 204, and/or any other output devices provided with apparatus. The processor 208 may also store the data for later use in the memory 207. The memory 207 may store computer program code and/or applications which may be used to instruct/enable the processor 208 to perform functions (e.g. read, write, delete, edit or process data).

Figure 3:
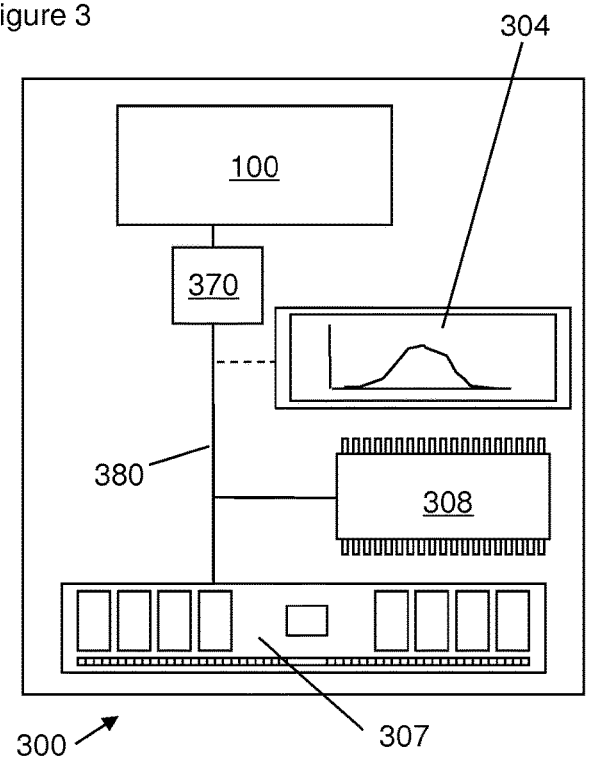
FIG. 3 illustrates an example apparatus example comprising a number of electronic components, including memory and a processor, according to another example of the present disclosure.

FIG. 3 depicts a further example of an electronic device 300 comprising the apparatus 100 of FIG. 1. The apparatus 100 can be provided as a module for device 300, or even as a processor/memory for the device 300 or a processor/memory for a module for such a device 300. The device 300 comprises a processor 308 and a storage medium 307, which are connected (e.g. electrically and/or wirelessly) by a data bus 380. This data bus 380 can provide an active coupling between the processor 308 and the storage medium 307 to allow the processor 308 to access the computer program code. It will be appreciated that the components (e.g. memory, processor) of the device/apparatus may be linked via cloud computing architecture. For example, the storage device may be a remote server accessed via the internet by the processor.

The apparatus 100 in FIG. 3 is connected (e.g. electrically and/or wirelessly) to an input/output interface 370 that receives the output from the apparatus 100 and transmits this to the device 300 via data bus 380. Interface 370 can be connected via the data bus 380 to a display 304 (touch-sensitive or otherwise) that provides information from the apparatus 100 to a user. Display 304 can be part of the device 300 or can be separate. The device 300 also comprises a processor 308 configured for general control of the apparatus 100 as well as the device 300 by providing signalling to, and receiving signalling from, other device components to manage their operation.

The storage medium 307 is configured to store computer code configured to perform, control or enable the operation of the apparatus 100. The storage medium 307 may be configured to store settings for the other device components. The processor 308 may access the storage medium 307 to retrieve the component settings in order to manage the operation of the other device components. The storage medium 307 may be a temporary storage medium such as a volatile random access memory. The storage medium 307 may also be a permanent storage medium such as a hard disk drive, a flash memory, a remote server (such as cloud storage) or a non-volatile random access memory. The storage medium 307 could be composed of different combinations of the same or different memory types.

Figure 4:
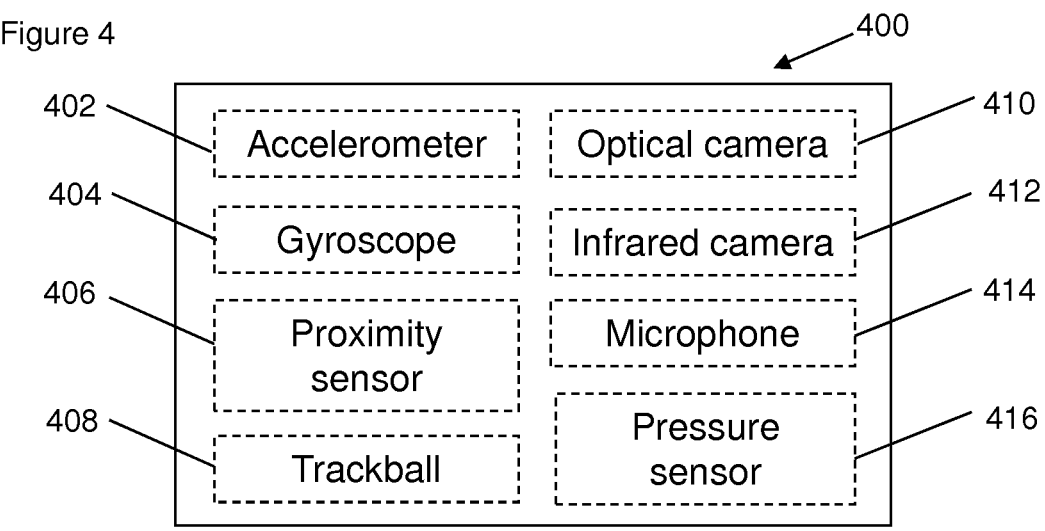
FIG. 4 illustrates an example apparatus comprising a number of possible input sensors/devices according to examples of the present disclosure.

FIG. 4 illustrates an example apparatus/device 400 comprising a number of possible input sensors/devices 402, 404, 406, 408, 410, 412, 414, 416. Such input sensors may be used to detect the manner in which the user is scribing. The apparatus 400 may comprise an apparatus 100, 200, 300 described earlier, and may allow for wireless communications and/or data processing, for example. The apparatus/device 400 may comprise one or more of the following user input elements: an accelerometer 402; a gyroscope 404; a proximity sensor 406; a trackball 408; an optical camera 410; an infra-red camera 412; a microphone 414; and a pressure sensor 416. These input elements may be configured to determine input manner characteristics of a user when scribing text/characters/drawings using the apparatus/device 400.

As an example, a built-in accelerometer 402 (such as a triaxial accelerometer) may be placed near the corner of the mobile phone or the tip of the digital pen/stylus to collect the signals of the motion made by a user scribing using the mobile phone/digital pen. If the user's grip moves/rotates on an electronic stylus while scribing, a gyroscope 404 in the stylus may be used to determine the rotation and obtain motion data of the stylus, and may complement data obtained from an accelerometer to obtain more accurate stylus motion data. The accelerometer 402 and/or gyroscope 404 data may then be sent to the mobile phone processor to recognize the scribed characters/letters using a specific trajectory recognition algorithm.

A proximity sensor 406 in an electronic stylus may be used to detect, when the user in scribing on a surface, whether the stylus is contacting the scribing surface or whether the stylus is being moved away from the surface between scribed characters/letters. That is, when the stylus is detected to be in contact with the surface, the motion of the stylus can be detected as scribing input, and when the stylus is detected to be out of contact with the scribing surface, the motion of the stylus can be detected as non-scribing input. There may also be a predetermined time interval setting within which it is determined that the user is scribing the same letter/word, and after which it is determined that the user is scribing a different letter/word, for example.

As another example, a small trackball 408, scroll wheel or similar may be included in an electronic stylus (such as at the corner of a mobile telephone or at the scribing tip of an electronic pen). The rolling movements of the trackball 408/wheel may be detected and the motion information signalled to the stylus processor to determined the motion of the stylus and whether or not the stylus tip is in contact with a surface.

As another example, an optical 410 and/or infrared camera 412 may be included in an electronic stylus. The camera 410, 412 may be used to track the movements of the corner/tip of the stylus and may be used to detect the distance between the corner/tip and the scribing surface to determine whether or not the stylus corner/tip is in contact with the surface or not, and in some examples may be used to determine the type of scribing surface (such as paper, wood or glass, for example).

As another example, a microphone 414 may be included in an electronic stylus and configured to detect the sound of the stylus corner/tip on a surface. The detected sounds may be processed and used to determine the type of surface on which the stylus is moving. The detected sounds of a stylus moving across, for example, wood, glass, paper, and skin, may all have different characteristic sound "fingerprints".

As another example, a pressure sensor 416 may be used to determine the pressure with which a user is scribing with the stylus on a surface. The sensor may be able to discriminate between, for example, no pressure (the user is scribing in air), low/light pressure and high/heavy pressure.

Various combinations of the input sensors illustrated in FIG. 4 may be used. For example, to determine the type of scribing surface, input from a combination of an optical camera directed towards the scribing surface and a microphone may be used to characterise the scribing surface. As another example, an accelerometer may detect the particular motions of the stylus and a proximity sensor may determine whether the user is scribing on a surface or in air. An accelerometer which is configured to determine the orientation of the stylus with respect to gravity may be used to determine if the user is scribing on a horizontal, vertical, or angled plane, for example.

FIGS. 5a-5d-10a-10b illustrate example different manners with which a user may provide electronically-scribed input. Manners of scribing may be detected using one or more of the sensors described in relation to FIG. 4.

FIGS. 5a-5d illustrate examples of an apparatus/device 500 being used for user electronic-scribing on different determined input planes. The plane may be a real physical plane (that is, the user may scribe on an object's surface) or the plane may be an imaginary plane (that is, the user may scribe in mid-air).

Figure 5A:
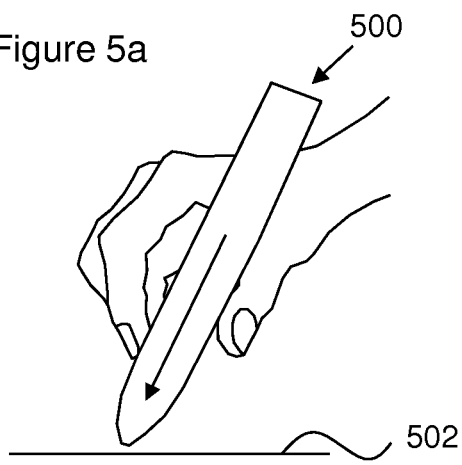
FIGS. 5a-5d illustrate user electronic-scribing in different determined input planes according to examples of the present disclosure.
Figure 5B:
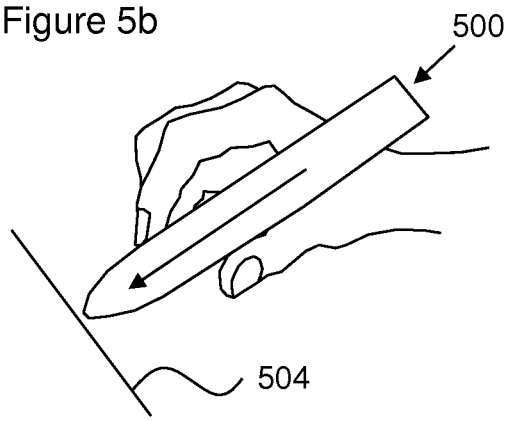
Figure 5C:
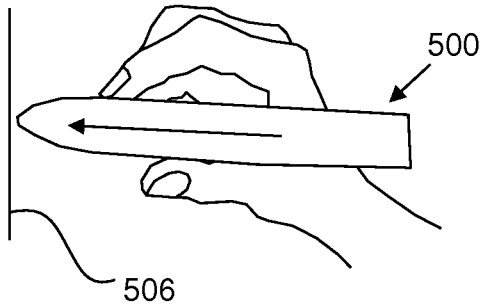
Figure 5D:
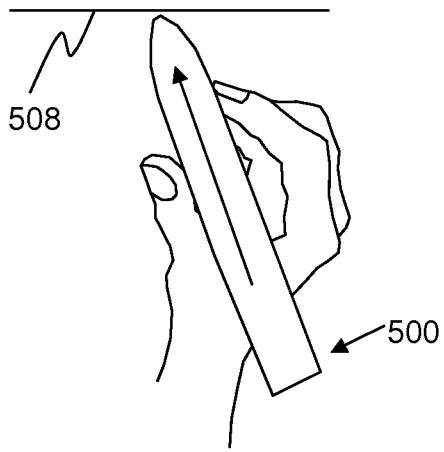

In FIG. 5a, the user is scribing on a horizontal plane 502 wherein the plane faces up (with respect to the gravity vector), such as a tabletop, an item laid on a tabletop (such as a sheet of paper), or an upturned palm of a hand for example. In FIG. 5b, the user is scribing on an angled plane 504 angled between horizontal and vertical, such as a lectern. In FIG. 5c, the user is scribing on a vertical plane 506, such as a wall, whiteboard, or in the air as if scribing on a wall. In FIG. 5d, the user is scribing on a horizontal plane 508 in which the plane faces down towards the ground such as on a (e.g., imaginary) ceiling.

Each different plane 502, 504, 506, 508 may be associated with a different function to be performed on the scribed input. That is, the apparatus/device 500 may be configured to associate the determined input manner characteristic of a particular determined input plane 502, 504, 506, 508 of an electronic stylus 500 during the scribing of the user electronic-scribed input with, for example, transmitting the user electronic-scribed input to a particular device. For example, scribing on a vertical plane 506 may transmit the scribed input to a projector for projection onto a screen, whereas scribing on a horizontal tabletop 502 may transmit the scribed input to a laptop computer.

The angle of the stylus 500 with respect to the plane may or may not be determined. The input plane may be determined as the plane in which the input is scribed. The angle of the stylus with respect to a plane may be determined as the difference between the plane of the scribing surface and the plane normal to the stylus.

Figure 6A:
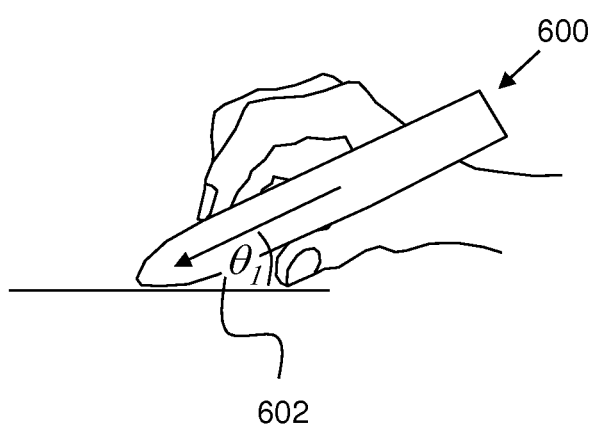
FIGS. 6a-6b illustrate user electronic-scribing using different determined input angles of an electronic stylus according to examples of the present disclosure.
Figure 6B:
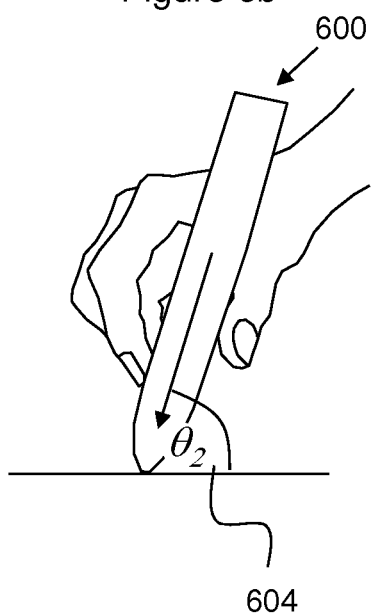

FIGS. 6a-6b illustrate examples of an apparatus/device 600 being used for user electronic-scribing using different determined input angles of an electronic stylus with respect to the scribing plane. In FIG. 6a, the user is scribing on a horizontal plane with the stylus 600 as a relatively shallow angle, $\theta_1$, with respect to the plane. In FIG. 6b, the user is scribing on a horizontal plane with the stylus 600 as a relatively steep angle, $\theta_2$, with respect to the plane. The angle $\theta$ may be detected, for example, through pressure sensors at the tip of the stylus 600 configured to detect what part of the tip is in contact with a surface. The angle $\theta$ may be detected, for example, through accelerometer and gyroscope measurements which may be used to determine the angle $\theta$ of the stylus 600 with respect to the plane in which the user is scribing (in this example the user may scribe on a physical or imaginary/air plane).

Each different angle $\theta_1$, $\theta_2$ may be associated with a different function to be performed on the scribed input. That is, the apparatus/device 600 may be configured to associate the determined input manner characteristic of a particular determined input angle $\theta_1$, $\theta_2$ of an electronic stylus 600 during the scribing of the user electronic-scribed input with, for example, entering the scribed text in a particular application. Scribing at an angle $\theta_1$ may enter the scribed text in an internet search term entry field, and scribing at an angle $\theta_1$ may enter the scribed text in an SMS message, for example. In some examples, more than two scribing angles may be discriminated and associated with respective functions to be performed on the scribed input.

Figure 7A:
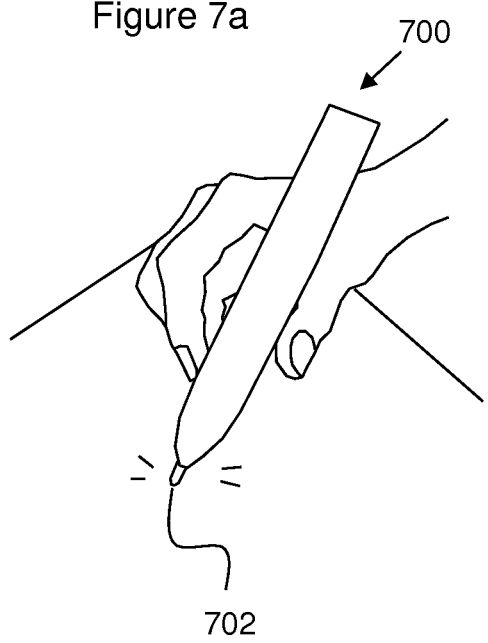
FIGS. 7a-7b illustrate user electronic-scribing using different applied pressures according to examples of the present disclosure.
Figure 7B:
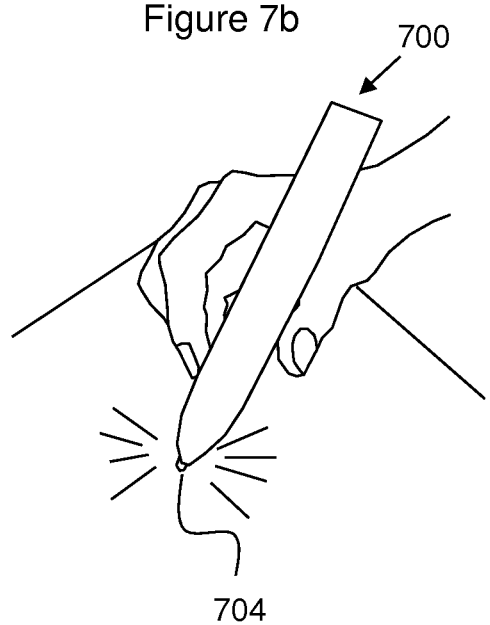

FIGS. 7a-7b illustrate examples of an apparatus/device 700 being used for user electronic-scribing using different applied pressures. In FIG. 7a, the user is scribing using a relatively light/low pressure 702. In FIG. 7b, the user is scribing using a relatively heavy/high pressure 704. Each different pressure 702, 704 may be associated with a different function to be performed on the scribed input. That is, the apparatus/device 700 may be configured to associate the determined input manner characteristic of a particular determined applied pressure 702, 704 of an electronic stylus 700 during the scribing of the user electronic-scribed input with, for example, entering the scribed text in a particular text style (and in some examples in a particular document type). Scribing using a light pressure 702 may enter the scribed text in a script style font (for example in the body of a letter/email), whereas scribing using a heavy pressure 704 may enter the scribed text in a bold formal typeface (for example, as a title) in a word processed letter. In some examples, more than two scribing pressures 702, 704 may be discriminated.

Figure 8A:
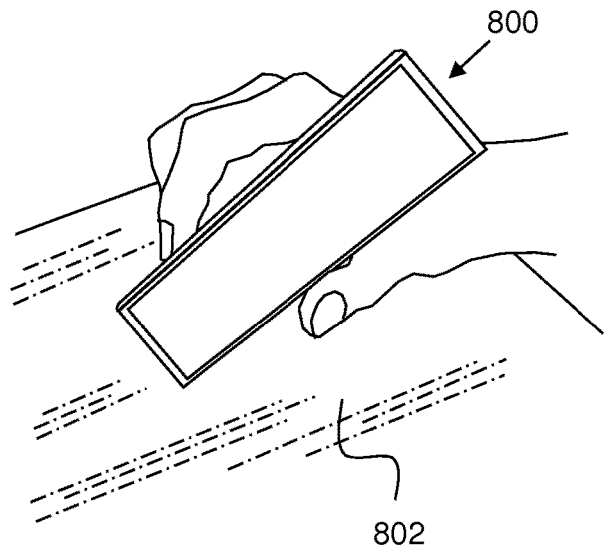
FIGS. 8a-8d illustrate user electronic-scribing on different surface types according to examples of the present disclosure.
Figure 8B:
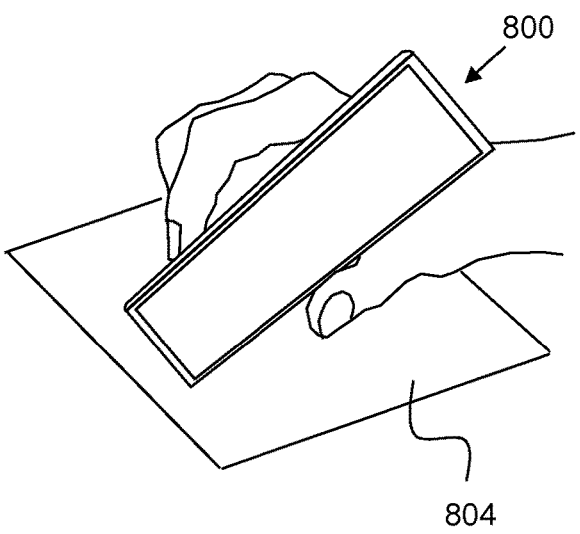
Figure 8C:
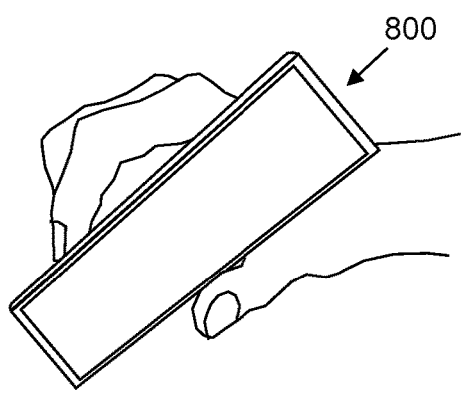
Figure 8D:
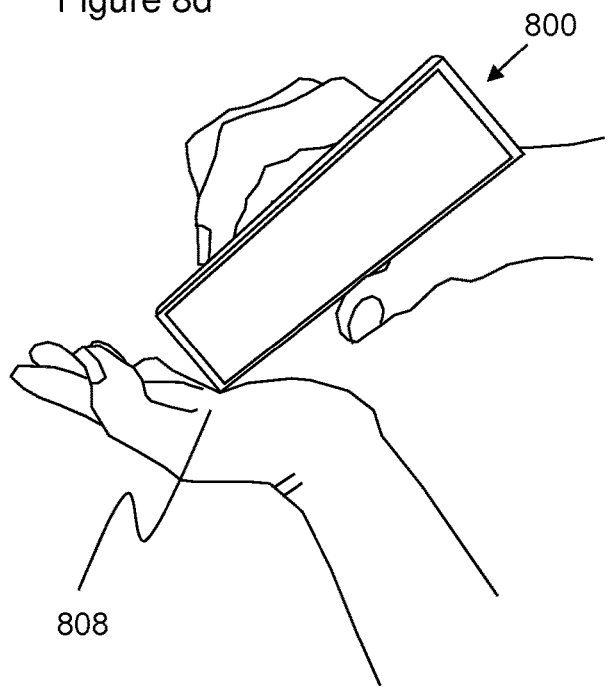

FIGS. 8a-8d illustrate examples of an apparatus/device 800 being used for user electronic-scribing on different surfaces. In FIG. 8a, the user is scribing on a wooden tabletop 802. In FIG. 8b, the user is scribing on a sheet of paper 804. In FIG. 8c, the user is scribing in mid-air 806 and the stylus is not contacting a surface. In FIG. 8d, the user is scribing on his palm, thus on a human skin surface 808.

The particular surface may be detected in different ways. For example, the human hand/skin 808 is softer than a (e.g., wooden) desk surface 802, 804, so the pressure on the stylus when scribing on skin 808 is smaller than when scribing on a desk 802, 804. Thus by determining the pressure with which the user is scribing, this may be used to determine the scribing surface. Such detection may be used in combination with another method, such as using a microphone to record the sound of the stylus on the surface and compare the recorded sound with a pre-stored list of sounds of different surfaces being scribed upon. Another method of determining the scribing surface type is to use a camera to record images of the surface and compare the images with pre-stored surface images to determine the surface type being scribed on.

Scribing on a particular surface may be associated with the function of transmitting the scribed input to a particular application. For example, scribing on a tabletop may transmit the scribed input to an e-mail; scribing on a sheet of paper may transmit the scribed input to a word processing document, scribing in mid-air may transmit the scribed input to a social media application, and scribing on skin may transmit the scribed input to an internet search engine search term entry field. Thus the apparatus/device 800 may be configured to associate the determined input manner characteristic of a particular determined surface 802, 804, 806, 808 on which the user electronic-scribed input is made with including the user electronic-scribed input in a particular type of electronic document and/or application. Of course, scribing on a particular surface type may be associated with applying a different function to the scribed input, such as associating the input with a particular language, for example.

Figure 9A:
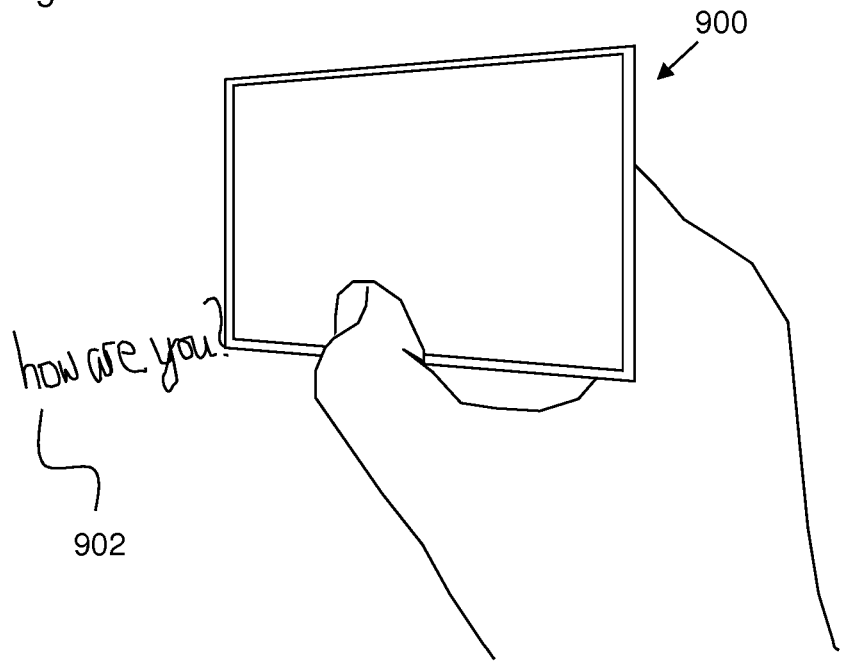
FIGS. 9a-9b illustrate user electronic-scribing using different sized handwriting according to examples of the present disclosure.
Figure 9B:
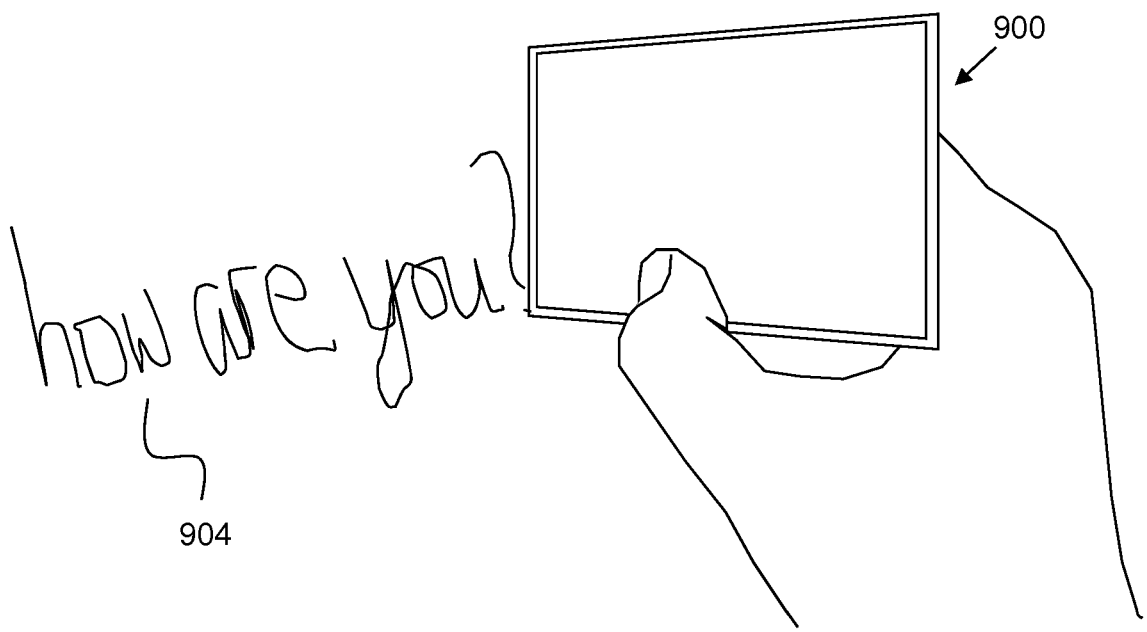

FIGS. 9a-9b illustrate examples of an apparatus/device 900 being used for user electronic-scribing with different sized handwriting. The apparatus/device 900 in this example may be a smartphone or PDA, for example. In FIG. 9a, the user is scribing with small handwriting 902. In FIG. 9b, the user is scribing with large handwriting 904. The function to be performed on the scribed input may be to transmit the scribed input to a particular device depending on the relative size of the scribed text. Thus, scribed input determined to be small text may be transmitted to a mobile electronic device, whereas scribed input determined to be large text may be transmitted to a display screen, for example. The size may be compared with pre-stored sensor readings for differently sized scribing/writing, for example.

Figure 10A:
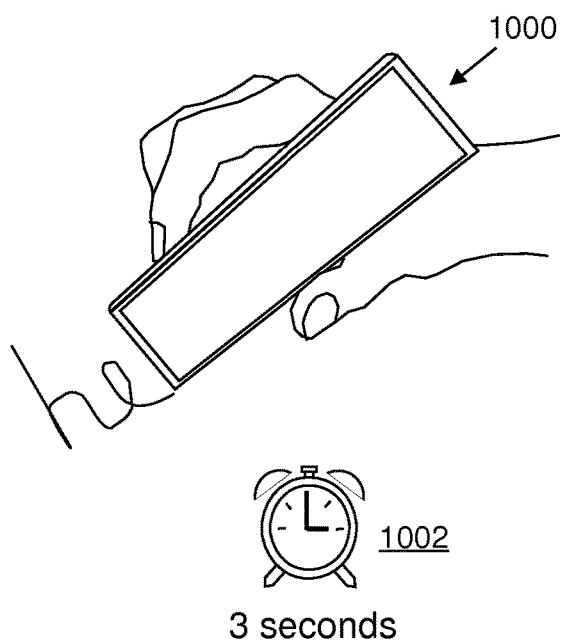
FIGS. 10a-10b illustrate user electronic-scribing using different scribing speeds according to examples of the present disclosure.
Figure 10B:
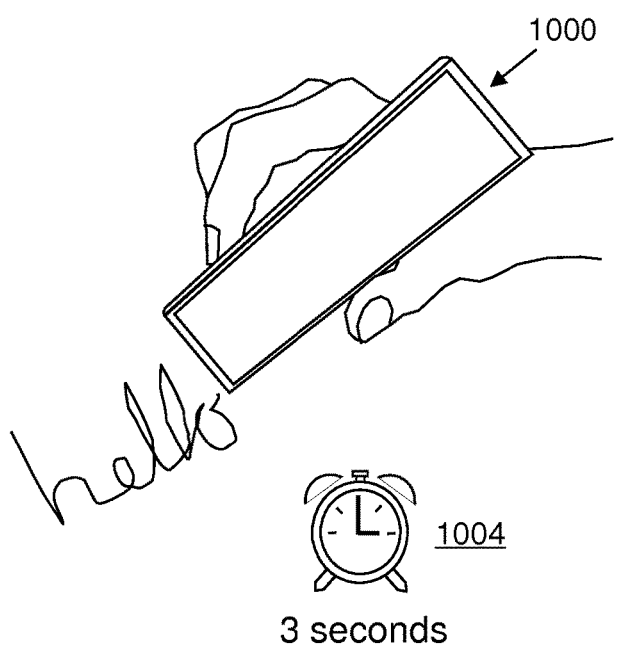

FIGS. 10a-10b illustrate examples of an apparatus/device 1000 being used for user electronic-scribing with different handwriting speeds. In FIG. 10a, the user is scribing relatively slowly and has scribed the first two letters of the word "hello" in three seconds 1002. In FIG. 10b, the user is scribing relatively quickly and has written the whole word "hello" in three seconds 1004. The speed of scribing may be detected using, for example, an accelerometer within the stylus 1000 to detect the speed and rate of change of stylus direction, for example. The function performed on the scribed input depending on scribing speed may be transmitting the input to a particular electronic document type. Thus scribed input determined to be slow may be transmitted to an e-mail, whereas scribed input determined to be quick may be transmitted to an SMS application, for example.

Figure 11A:
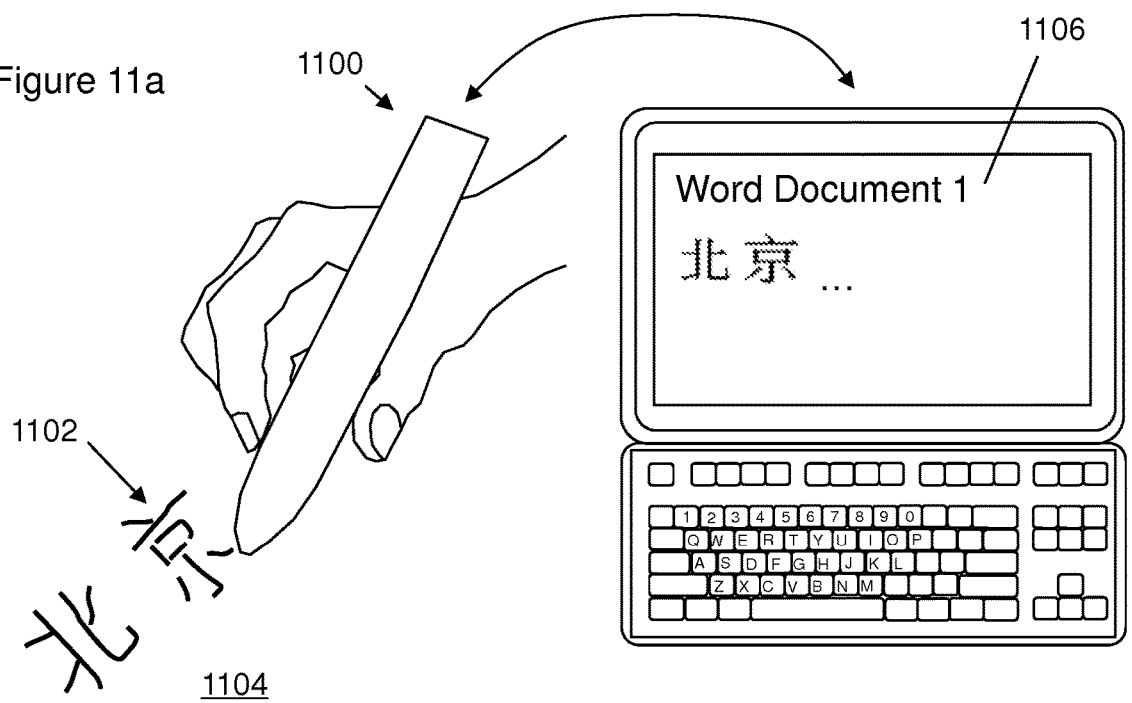
FIGS. 11a-11b illustrate user electronic-scribed input included in particular types of electronic documents according to examples of the present disclosure.
Figure 11B:
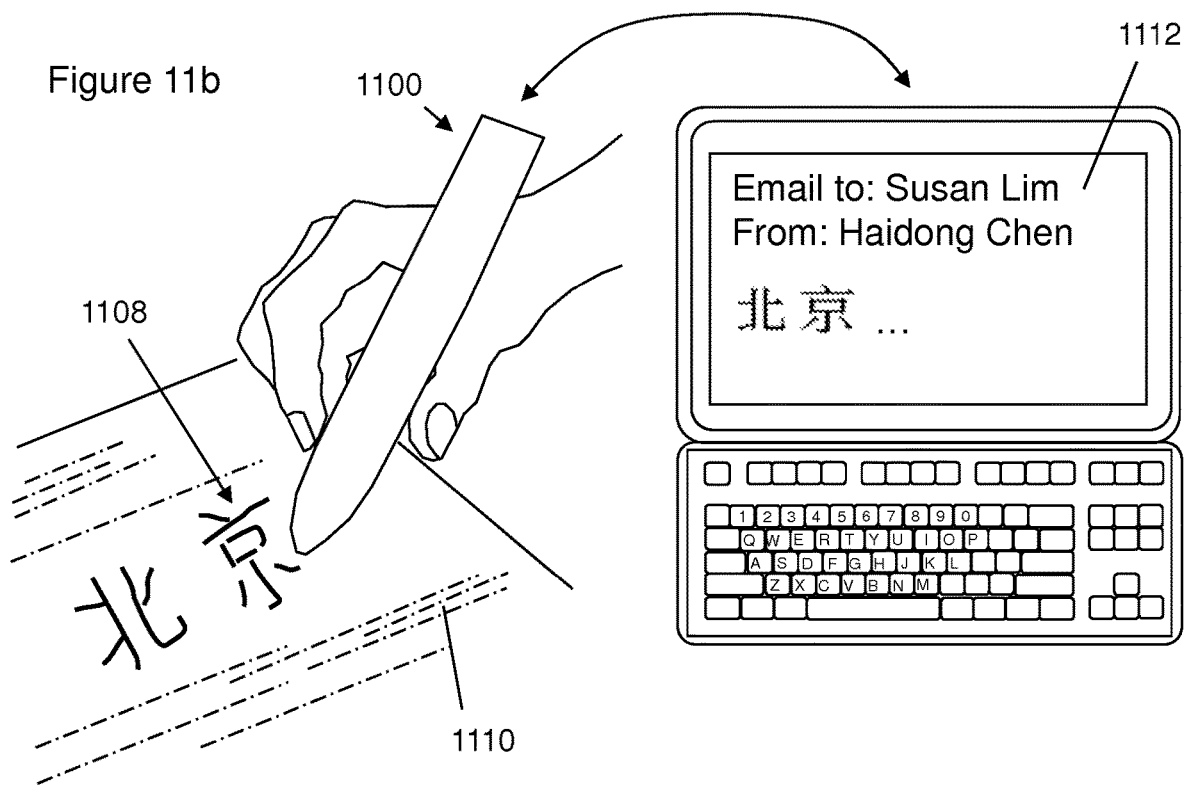

FIGS. 11a-11b illustrate examples of an apparatus/device 1100 in use, in which the user electronic-scribed input is included in a particular type of electronic document. The surface type 1104, 1110 in the two examples is different, and the function of including the scribed input in a particular type of electronic document is determined by the surface on which the input is scribed in this example.

FIG. 11a shows a user using an electronic stylus 1100 to scribe Chinese characters 1102 in mid-air 1104 (that is, on no surface). The user electronically-scribed input 1102 scribed in mid-air 1104 is transmitted to a word document 1106. FIG. 11b shows the user using the electronic stylus 1100 to scribe Chinese characters 1108 on a wooden desk 1110. The user electronically-scribed input 1108 scribed on the wooden desk 1110 is transmitted to an e-mail 1112. Thus, scribing in air is associated with input to a word document and scribing on a wooden surface is associated with input to an e-mail, in this example. Of course, in other examples any manner characteristics may be associated with particular document types, and not just the material/type of the scribing surface.

In this example, the apparatus/device 1100 is configured to allow the user electronic-scribed input 1102, 1108 to be included in a particular type of electronic document 1106, 1112. In this example the two documents are an e-mail 106 and a word processing document 1112. In other examples the document may be, for example, an SMS message, an MMS message, a chat message, an electronic note, a drawing, a spreadsheet, a database, a search field, a web address, or a social media post. For example, a user may scribe an "invisible" text message on his palm (and on skin surface), and the determination that the user has scribed on skin may cause an SMS application to be launched and the scribed text to be entered in an SMS message. A user may, in another example, scribe on a sheet of paper, and the scribed text may be entered into a notebook application.

Determination of the manner in which user electronically-scribed input is made may cause an application associated with that manner to be opened (or if already open, that application may be made the "currently active" application), as well as entering the scribed input in the active associated application. In examples in which the scribing manner causes the scribed input to be entered into a message for transmission (such as an e-mail or SMS message), the manner in which the input is scribed may also be associated with how the scribed input is to be entered into the particular associated application.

For example, scribing on a wooden desk may launch/activate an e-mail application. Scribing on the desk while applying a light pressure may cause the scribed input to be entered into an email as a reply to the last received e-mail, whereas scribing on the desk while applying a heavy pressure may cause the scribed input to be entered into a draft email in which the desired recipient(s) can be entered at a later date. As another example, scribing in the air may launch/activate an SMS messaging application. Scribing in a vertical plane in air may cause the scribed text to be entered into an SMS message in which the recipient will be designated later, scribing in a horizontal plane in air may cause the scribed text to be entered into an SMS message in reply to the latest received message, and scribing in a plane at an angle between vertical and horizontal in air may cause the scribed text to be entered into an SMS message to a favourite contact, for example.

As another example, the particular document type in which the scribed input is to be entered may be determined by the scribing manner, and if the document type allows for transmission of the document to another person, then initially the user-scribed input may be input into a draft message. After the message has been completed, the user may be able to allocate the input message to a particular recipient using the electronic stylus. For example, the user may be able to scribe a particular instruction between two scribed gesture brackets to instruct who the scribed message should be sent to. The gesture brackets may be, for example, tapping the stylus twice. By tapping the stylus twice as a gesture to open the brackets, scribing "send to John", then tapping the stylus twice again as a gesture to close the brackets, the apparatus may be configured to perform a function according to the instruction provided between the gesture brackets on the entered message, namely to enter the text scribed outside the gesture brackets as text in the message and to configure the message to be sent to the contact labelled "John" based on the instruction within the gesture brackets. Of course any suitable gesture brackets may be used, such as a stationary press of the stylus for a predetermined period of time (e.g., three seconds), or the scribing of a particular gesture bracket symbol.

Figure 12A:
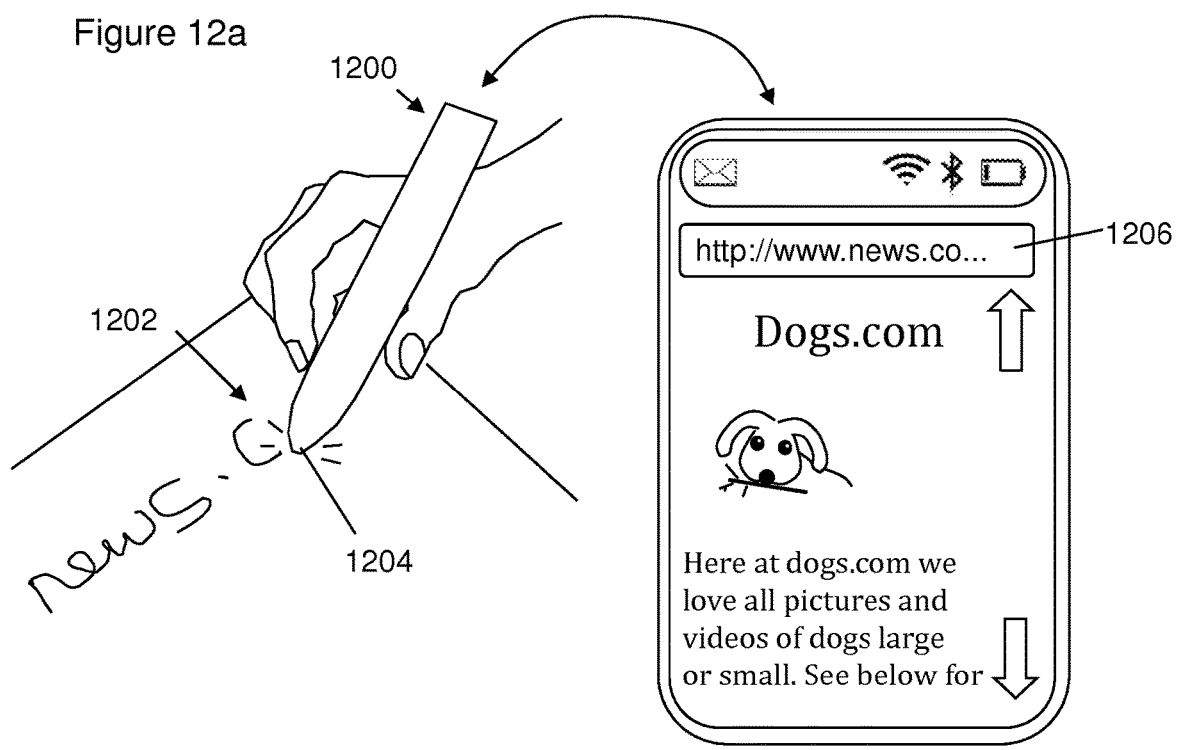
FIGS. 12a-12b illustrate user electronic-scribed input included in particular entry fields of particular applications according to examples of the present disclosure.
Figure 12B:
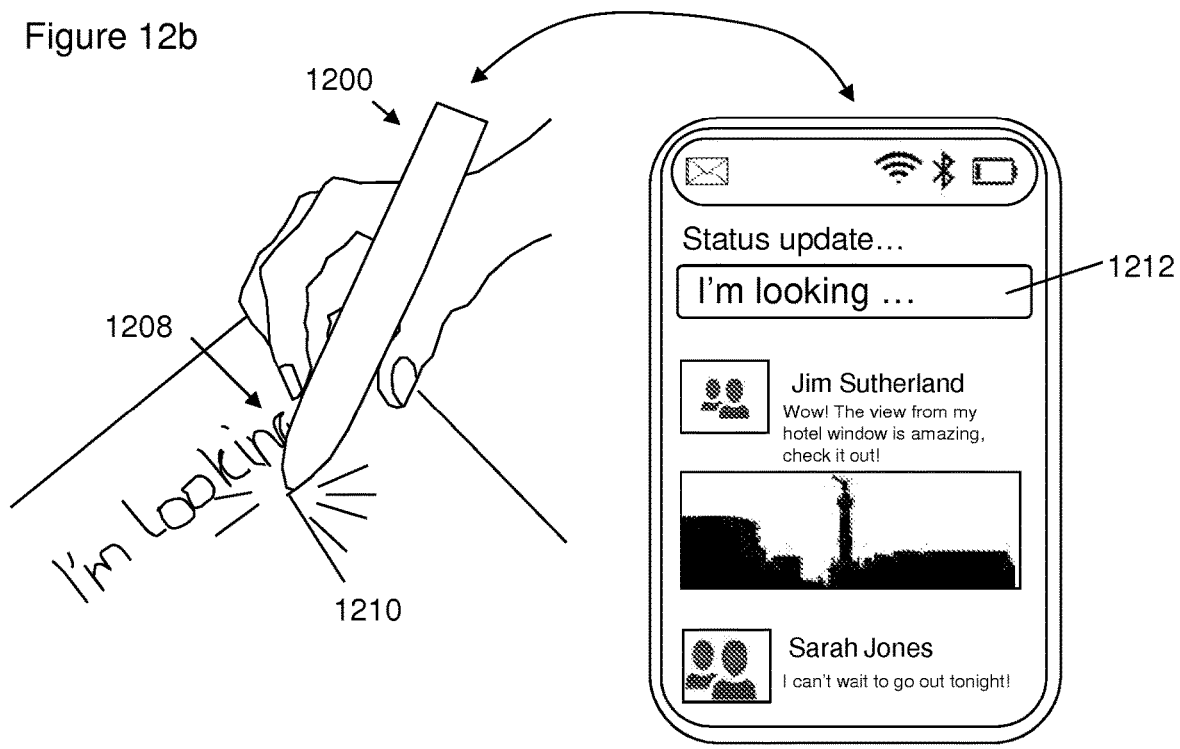

FIGS. 12a-12b illustrate examples of an apparatus/device 1200 in use, in which the user electronic-scribed input is included in a particular entry field of a particular application. FIG. 12a shows a user using an electronic stylus 1200 to scribe an internet address 1202 on a surface using a light pressure 1204. The user electronically-scribed input 1202 is transmitted to an internet browser web address entry field 1206. FIG. 12b shows the user using the electronic stylus 1200 to scribe a status update 1208 on a surface using a heavy pressure 1210. The user electronically-scribed input 1208 scribed with heave pressure 1210 is transmitted to the status update entry field 1212 of a social media application. Thus in this example the pressure with which the user scribes the input is associated with entering the scribed input to a particular entry field of a particular application. Of course, in other examples, any manner characteristics may be associated with entry of scribed input in different entry fields, and not only a change in pressure.

In other examples, the text entry field may be a search field such as a filename entry field in a file explorer or a search term entry field in an internet search engine. In other examples, the text entry field may be a data input field, such as an information entry field in a form in which the user provides details such as a name, title, and address.

Figure 13A:
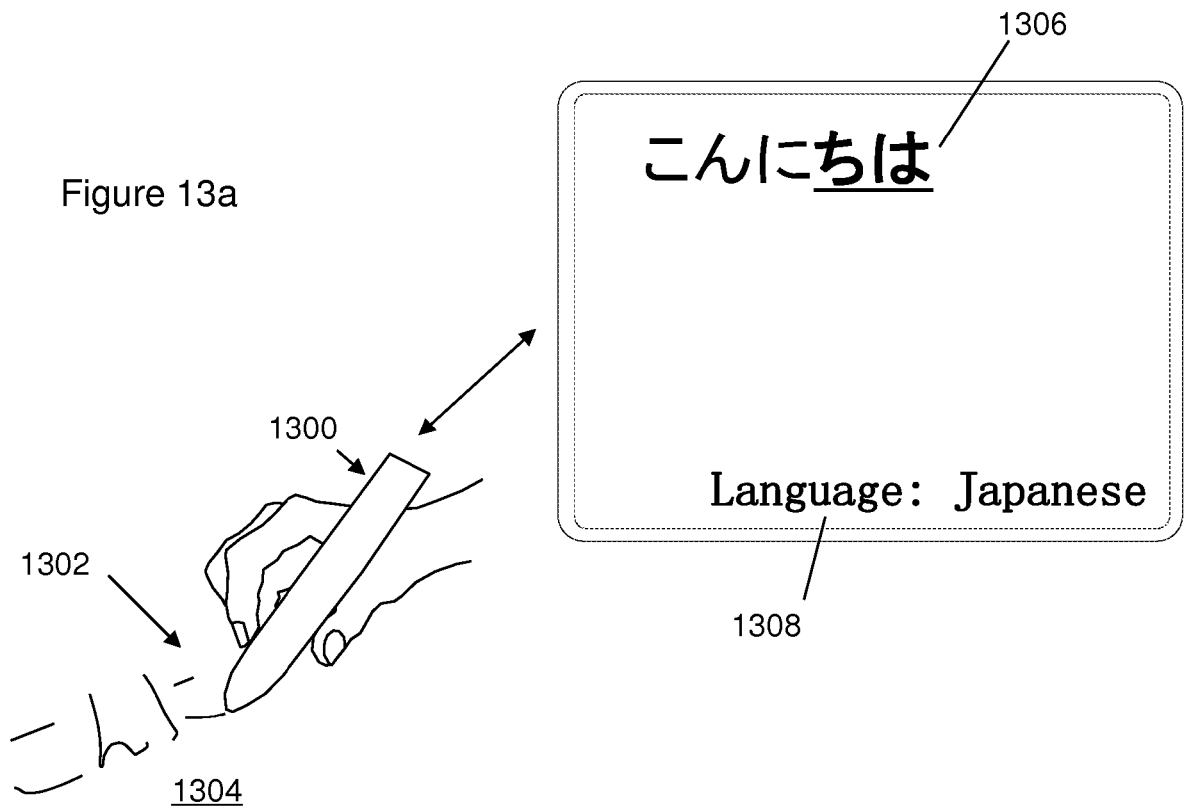
FIGS. 13a-13b illustrate user electronic-scribed input identified with particular languages according to examples of the present disclosure.
Figure 13B:
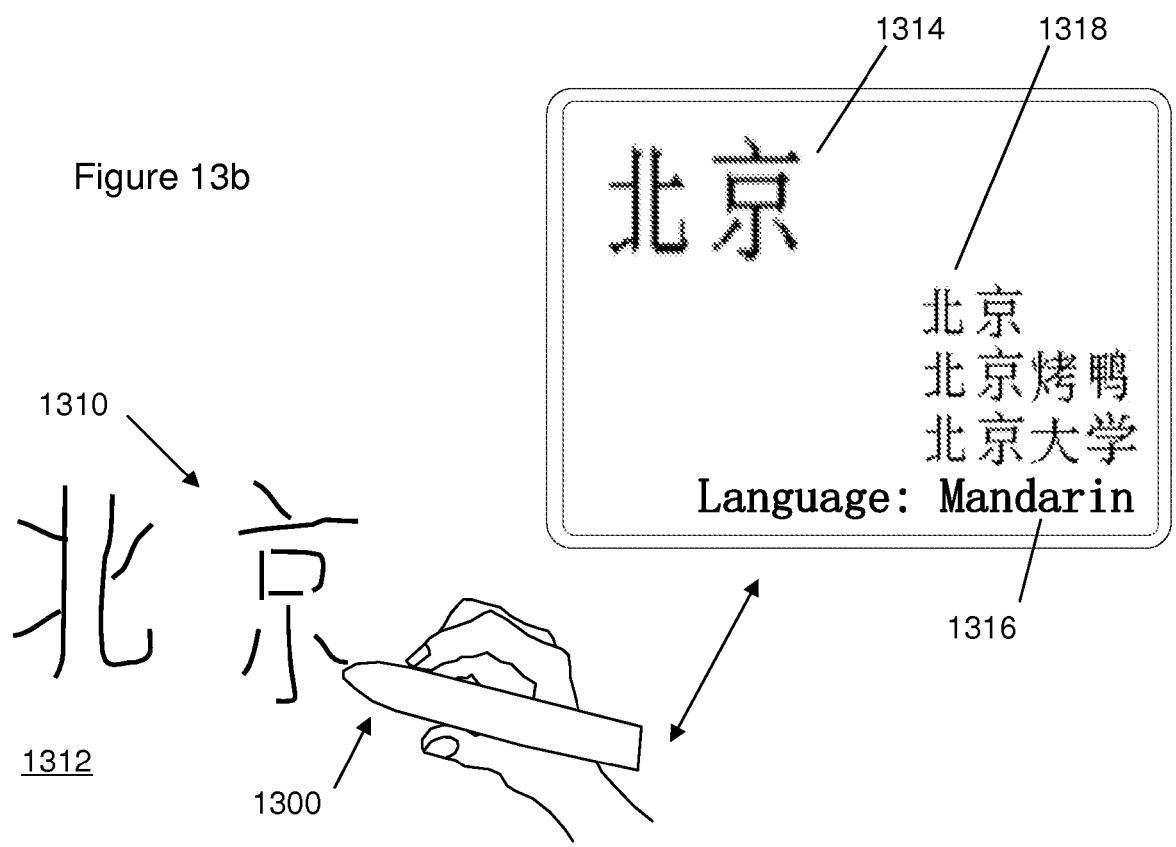

FIGS. 13a-13b illustrate examples of an apparatus/device 1300 in use, in which the user electronic-scribed input is identified with a particular language.

FIG. 13a shows a user using an electronic stylus 1300 to scribe Japanese Kanji 1302 in mid-air on an imaginary horizontal plane 1304. The user electronically-scribed input 1302 is transmitted to a text application. Due to the manner of scribing (on a horizontal plane), the scribed user input is associated with a particular language; in this case Japanese language text 1308. Thus, Japanese language assistance may be provided, which in this example is illustrated as auto-correction of scribed words 1306. The last portion of the Japanese word "Kon'nichiwa" (hello) is automatically provided because the entered text has been determined to be Japanese due to being scribed on a horizontal plane and the auto-completion language assistance function recognises the beginning of the Japanese word being entered, and can offer an automatic ending.

FIG. 13b shows a user using an electronic stylus 1300 to scribe Chinese characters 1330 in mid-air on an imaginary vertical plane. The user electronically-scribed input 1310 is transmitted to a text application. Due to the manner of scribing (on a vertical plane), the scribed user input is associated with a particular language; in this case mandarin Chinese language text 1316. Thus, Chinese language assistance is provided, which in this example is illustrated as predictive text corresponding to words and phrases beginning with the scribed characters 1314. The characters for "Beijing" 1314 have been entered, and the language has been detected as Chinese due to the input being scribed in a vertical plane so that phrases which begin with the characters for "Beijing" in Chinese are offered 1318 for user selection. Thus in this example the plane in which the user scribed the input is made is associated with a particular language. Of course, in other examples any manner characteristics may be associated with different language text entry, not only the scribing plane.

Figure 14A:
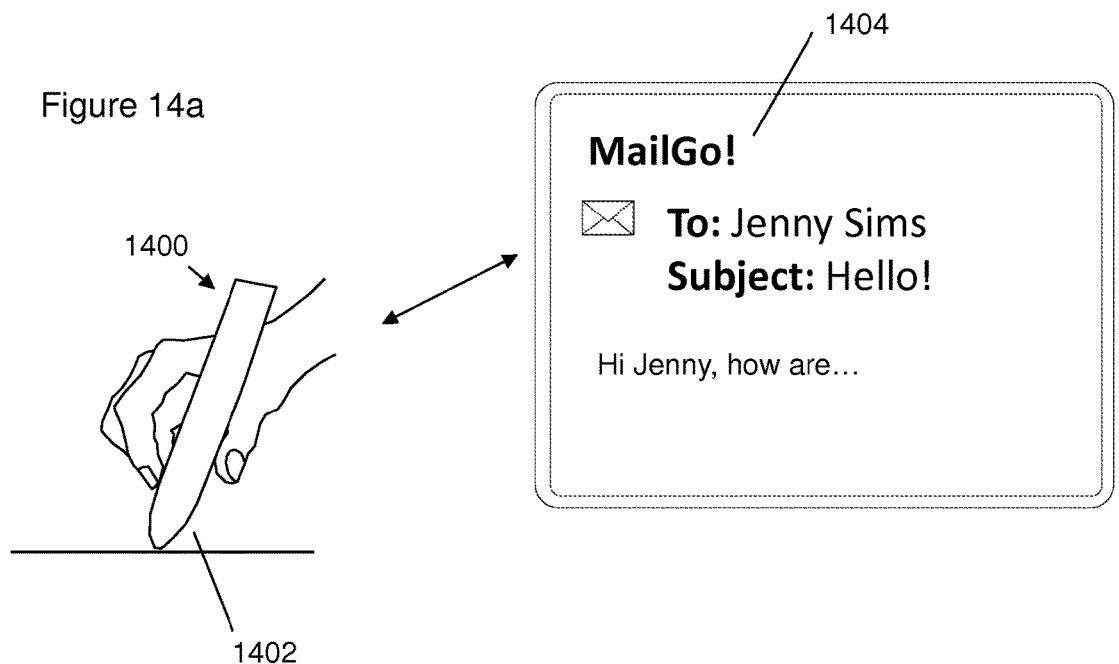
FIGS. 14a-14b illustrate user electronic-scribed input included in particular applications from a plurality of applications of the same type according to examples of the present disclosure.
Figure 14B:
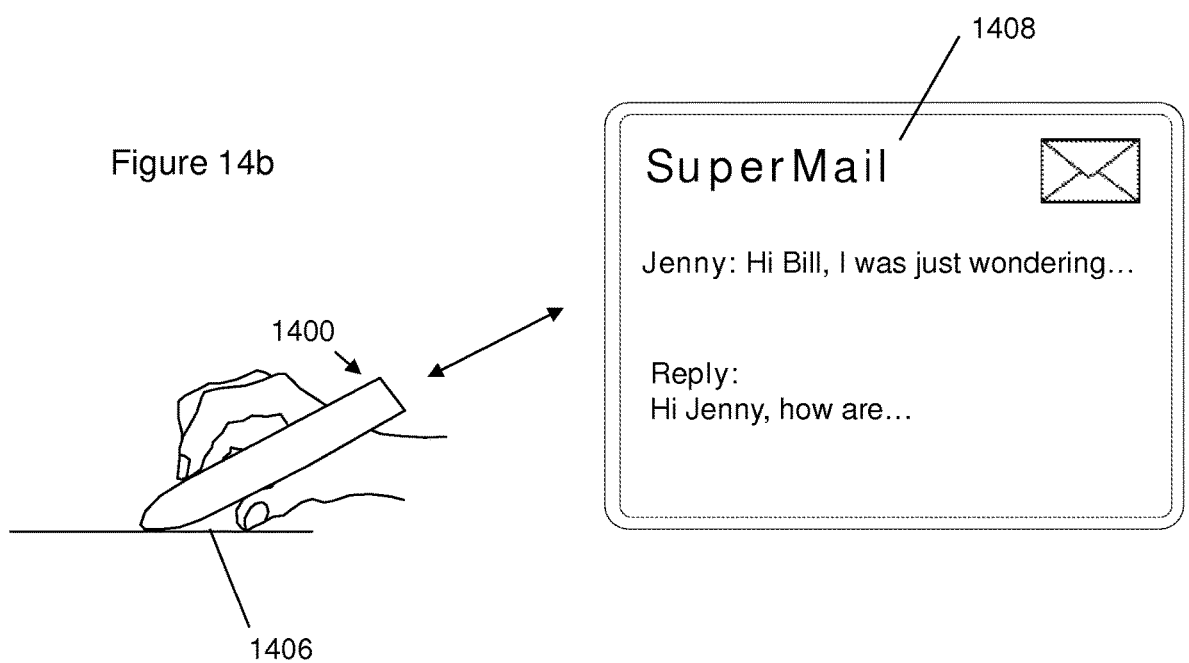

FIGS. 14a-14b illustrate examples of an apparatus/device 1400 in use, in which the user electronic-scribed input is included in a particular application from a plurality of applications of the same type. FIGS. 14a and 14b show a user using an electronic stylus 1400 to scribe a textual message for transmission in an e-mail to a contact Jenny Sims.

In FIG. 14a, the user scribes with the stylus 1400 at a relatively large angle 1402 with respect to the scribing plane so that the stylus 1400 in this example is close to normal to the scribing plane. The user electronically-scribed input is transmitted to a particular e-mail client of a plurality of available e-mail clients, in this example, "MailGo!" 1404, because the scribing angle is more that 75° from the scribing plane. In FIG. 14b the user scribes with the stylus 1400 at a relatively small angle 1406 with respect to the scribing plane (for example, between 25° and 30° from the scribing plane) so that the stylus in this example is less than 45° from the scribing plane. The user electronically-scribed input is transmitted to a different particular e-mail client of a plurality of available e-mail clients than that of FIG. 14a, in this example, "SuperMail!" 1408 because the scribing angle is less than 45° from the scribing plane. In other examples, different angular ranges may be used to determine a function to apply to the scribed input. Of course, in other examples any manner characteristics may be associated with entry in a particular one of a plurality of applications of the same type, and not only a change in stylus angle with respect to the scribing plane.

In other examples, allowing the user electronic-scribed input to be included in a particular application from a plurality of applications of the same type may comprise identification of the user electronic-scribed input with one or more of: a word processing application type (or other productivity application such as spreadsheet or database), a messaging application type, a calendar application type, a web browsing application type, and a social media application type. For example in relation to scribing a social media update for example, if a user scribes with the stylus close to normal to the scribing plane, the scribed input may be sent to a particular microblog website. If the user scribes with the stylus less than 30° from the scribing plane, the scribed input may be sent to a particular social media website. If the user scribes with the stylus between these two angles then the scribed input may be sent to both the particular microblog website and the other particular social media site.

Figure 15A:
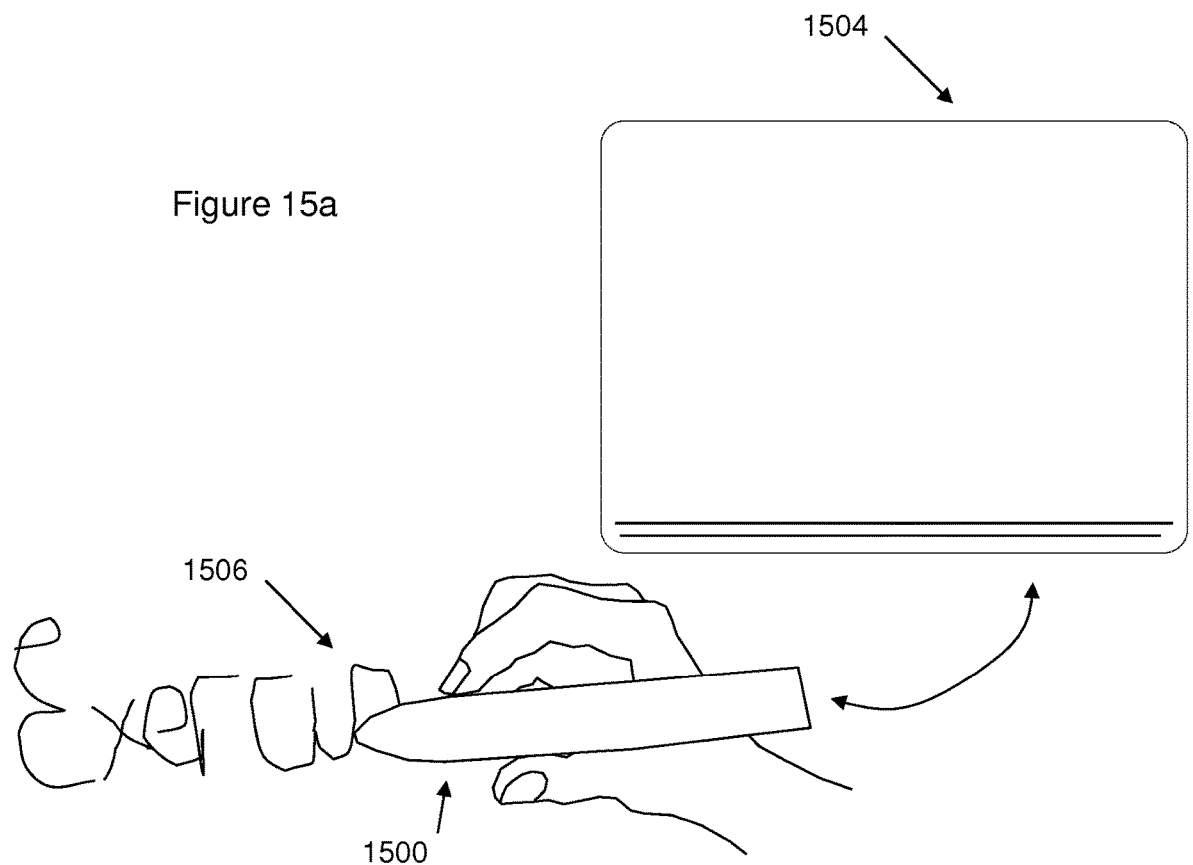
FIGS. 15a-15b illustrate user electronic-scribed input transmitted to particular devices according to examples of the present disclosure.
Figure 15B:
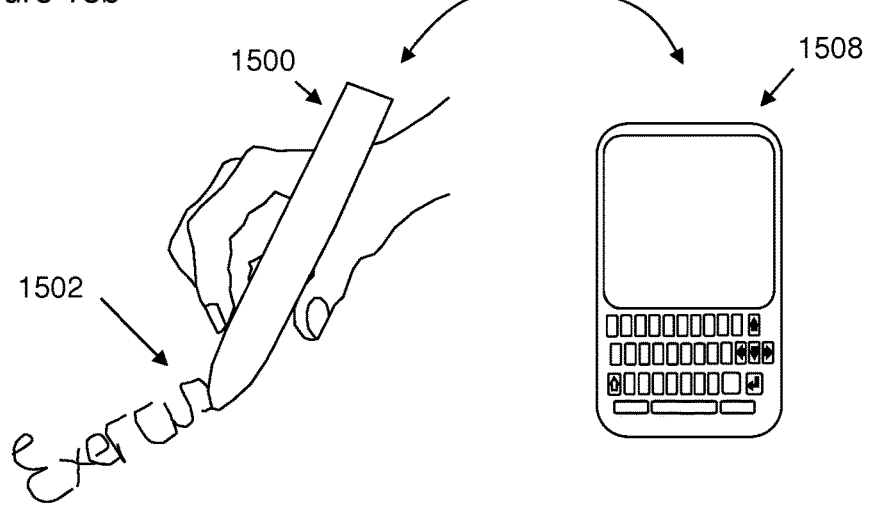

FIGS. 15a-15b illustrate examples of an apparatus/device 1500 in use, in which the user electronic-scribed input is included for transmission to a particular device.

In FIG. 15a, the user scribes relatively large letters 1502 with the stylus 1500, and the user electronically-scribed input is transmitted to an electronic whiteboard/display screen device 1504. In FIG. 15b the user scribes relatively small letters 1506 with the stylus 1500, and the user electronically-scribed input is transmitted to a mobile telephone/messenger device. Of course, in other examples any manner characteristics may be associated with transmitting the scribed input to a particular device, and not only a change in the size of scribed writing.

In another example, the manner of scribing may be to scribe on a display screen of a device, thus scribing on a particular surface type and at a particular angle to the surface. For example, scribing on a laptop screen may be detected as scribing on a plastic surface in a plane 20° to 30° away from a vertical plane. The scribed input may be transmitted to the laptop computer. The electronic stylus may be switched into a "laptop mode" to transmission of the scribed input to the laptop. If the user scribes on the screen of a smartphone, this may be detected as scribing on a glass surface in an approximately horizontal plane, and the scribed input may be transmitted to the smartphone. The electronic scribe in this example may be switched into a "smartphone mode" to transmission of the scribed input to the smartphone.

The function associated with a particular manner of scribing may combine transmitting the scribed input to a particular device and opening a particular type of application on that device. For example, the scribed input may be transmitted to a laptop and cause a drawing application to open in which the scribed input is displayed. The scribed user input may be displayed on a display of the corresponding device in real time as the input is scribed. Thus the electronic stylus may be used as an electronic pen, providing the user with the effect of being able to directly draw/write in an application on a plurality of devices provided that the manner of scribing is associated with that particular device. If the required manner allows the user to scribe over the display screen of the device of interest, this may provide an intuitive and flexible user experience.

Another example of scribed user input being transmitted to a particular device is pointing and scribing in a particular manner (for example, in a vertical plane, in air with large scribing/writing) to transmit the scribed input to a projection wall/wall-mounted display board. Upon determination that the scribed user input is to be transmitted for display on the projection wall, the electronic stylus may be switched into a "laser pointer mode" and allow for use of the electronic stylus as a laser pointer. A further example is that a user may write in a particular manner and the scribed data may be transmitted for storage in a "cloud" computing network.

Figure 16A:
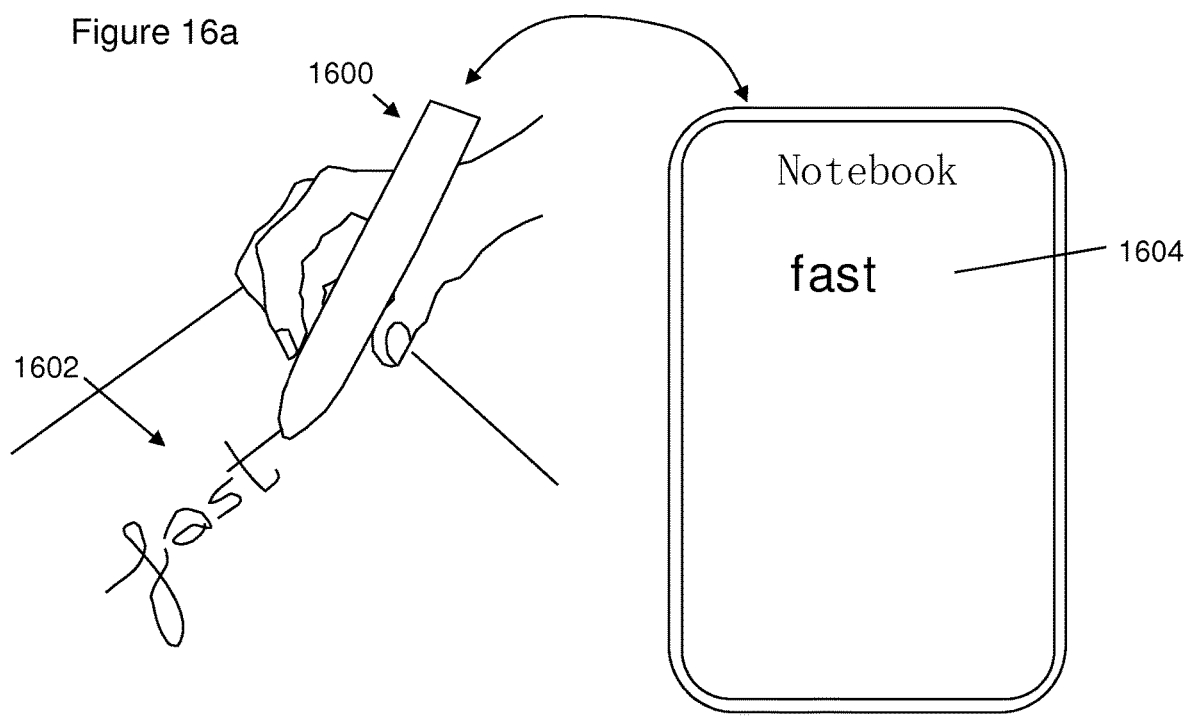
FIGS. 16a-16b illustrate user electronic-scribed input associated with particular writing styles according to examples of the present disclosure.
Figure 16B:
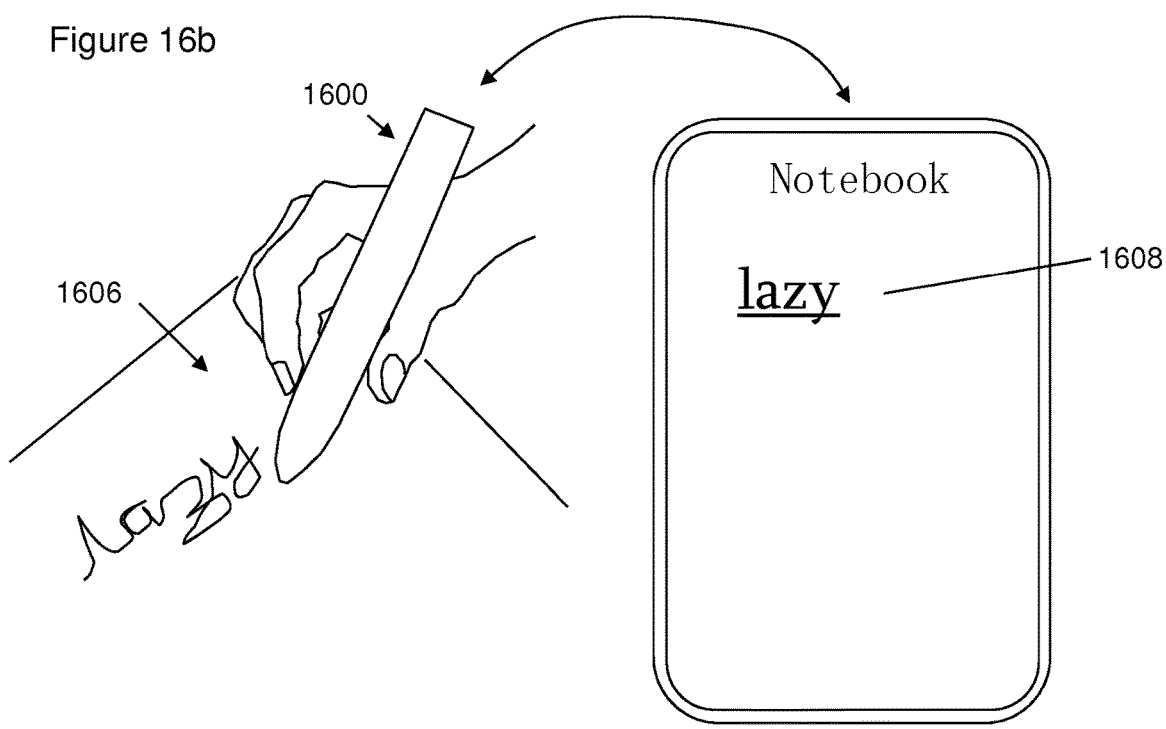

FIGS. 16a-16b illustrate examples of an apparatus/device 1600 in use, in which the user electronic-scribed input is associated with a particular writing style. In FIG. 16a, the user scribes the word "fast" relatively quickly 1602 with the stylus 1600. The user electronically-scribed input 1604 is transmitted to a display device and formatted in a particular way because of the manner the input was scribed (that is was scribed quickly). In this example, quickly scribed text 1602 is displayed in an informal script font 1604. In FIG. 16b, the user scribes the word "lazy" relatively slowly 1606 with the stylus 1600. The user electronically-scribed input 1608 is transmitted to a display device and formatted in a different particular way because of the manner the input was scribed (that is was scribed slowly). In this example, slowly scribed text 1606 is displayed in a formal serif font with underlining 1608.

The speed of scribing may be determined based on a prior user calibration, for example the user may perform a series of test-scribed inputs at different speeds as comparisons for a later scribed input. The calibration inputs may be recorded, for example, as having accelerometer readings within particular ranges for particular input speeds. Of course, in other examples any manner characteristics may be associated with displaying the scribed input in a particular style (including text style, text size, text formatting; and text colour), and not only a change in the speed of scribed writing.

Figure 17A:
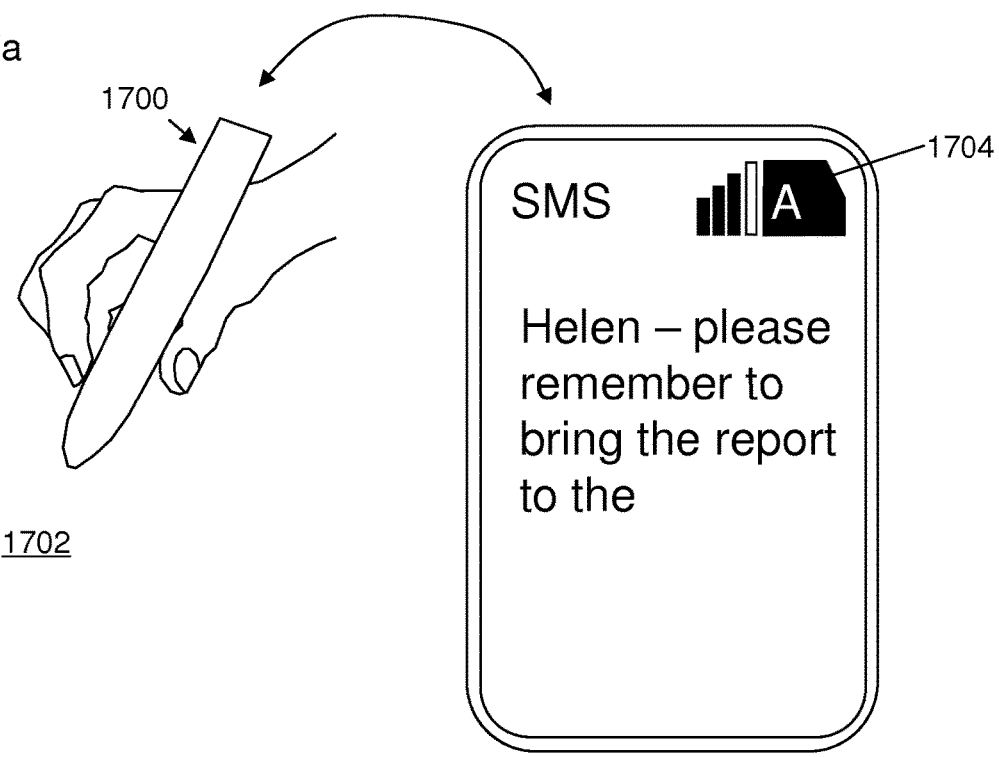
FIGS. 17a-17b illustrate user electronic-scribed input associated with electronic messages for transmission using particular network service cards according to examples of the present disclosure.
Figure 17B:
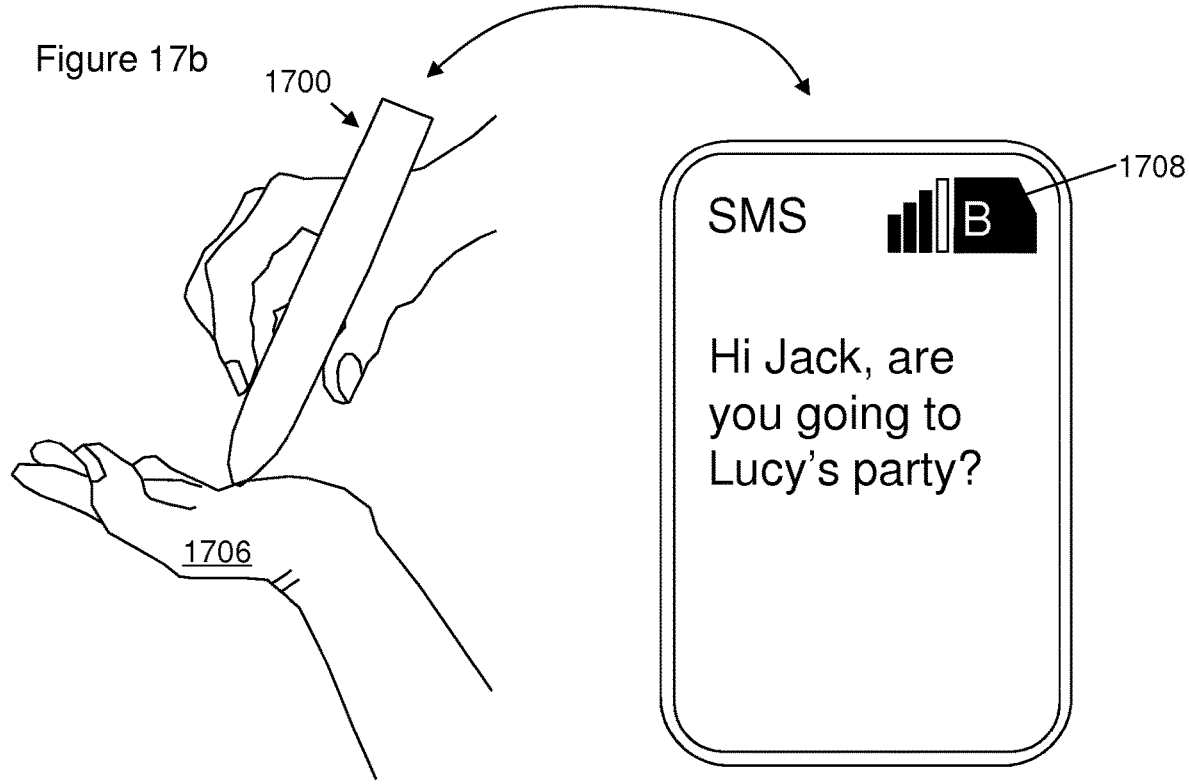

FIGS. 17a-17b illustrate examples of an apparatus/device 1700 in use, in which the user electronic-scribed input is associated with an electronic message for transmission using a particular network service card. In FIG. 17a, the user scribes a message "Helen—please remember to bring the report to the . . . " in mid-air 1702 and the user electronically-scribed input is transmitted to a display device for transmission using a particular network service card (SIM card number 1). The scribing surface (air, no surface) is associated with transmitting the input using SIM 1. In FIG. 17b the user scribes a message "Hi Jack, are you going to Lucy's party?" on his palm (that is, on a skin surface) and the user electronically-scribed input is transmitted to a display device for transmission using a different particular network service card (SIM card number 2). The skin scribing surface is associated with transmitting the input using SIM 2.

In other examples, scribing in different manners may cause the scribed input to be entered in an SMS message for transmission to a particular contact person, wherein the particular manner of scribing is associated with a particular contact person. Thus a user may scribe in a table to compose a message for transmission to contact A, and the user may scribe in mid air to compose a message for transmission to contact B, for example.

Figure 18A:
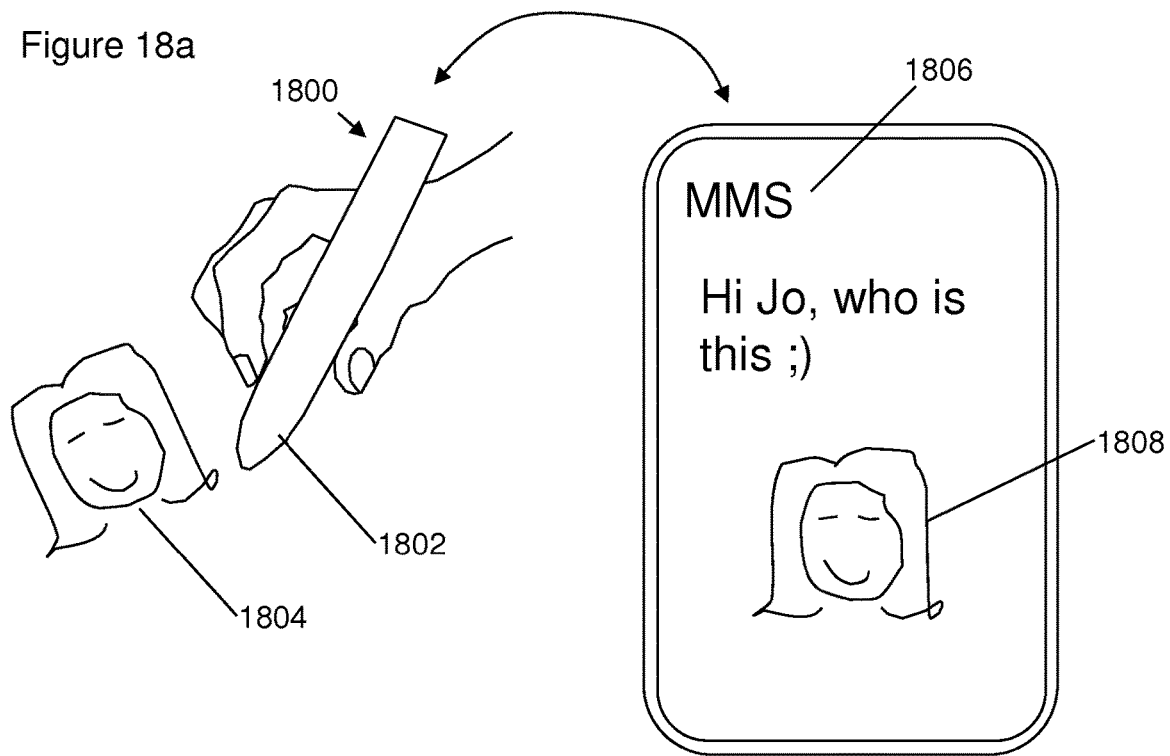
FIGS. 18a-18b illustrate user electronic-scribed drawn/picture image input according to examples of the present disclosure.
Figure 18B:
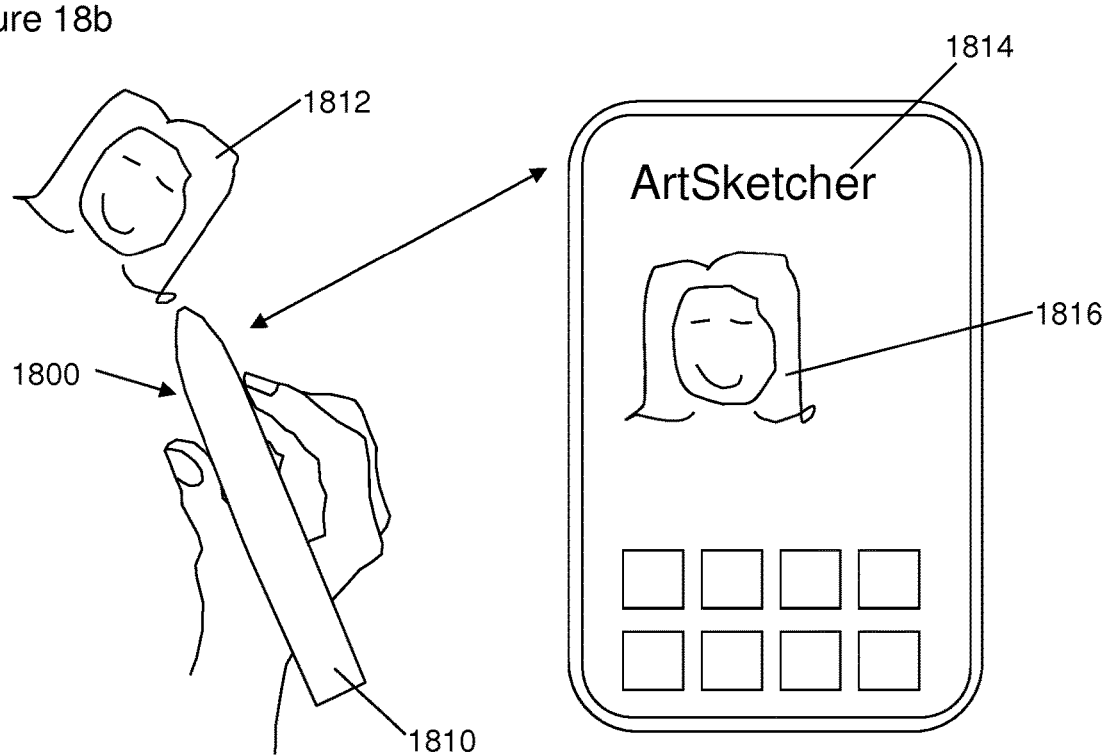

FIGS. 18a-18b illustrate examples of an apparatus/device 1800 in use, in which the user electronic-scribed input is drawn picture image input. In FIG. 18a, the user scribes a drawing 1804 in a manner with the stylus 1800 pointing towards the ground 1802 (that is, along towards the gravity vector). The user electronically-scribed drawing 1804 is transmitted to a display device for display 1808 in a particular application 1806 which can handle images (in this example, an MMS messaging application 1806). In FIG. 18b, the user scribes a drawing 1804 in a manner with the stylus 1800 pointing away from the ground 1812 (that is, in the opposite direction to the gravity vector). The user electronically-scribed drawing 1812 is transmitted to a display device for display 1816 in a different particular application 1814 which can handle images (in this example, a drawing application "ArtSketcher" 1814). As another example, if a user scribes graffiti on a wall, the manner of input (for example, on a vertical wall surface with relatively quick scribing strokes) may launch a drawing application and display the scribed graffiti in the application.

In certain examples, a combination of functions may be performed on scribed user input dependent on the manner with which the input is scribed. For example, if the user scribes a location name in a particular manner (for example, in mid air on an imaginary vertical plane with large handwriting), this manner of scribing may cause a map application to launch, and may cause the location search entry field to be populated with the scribed input text, and cause the location name scribed by the user to be identified on a map for the user. This example includes a combination of manner characteristics of user scribing, and a combination of functions to be performed on the scribed user input. A user may be able to configure an apparatus/device such that a particular manner of scribing is associated with a particular function to perform on the scribed user input, such as functions which the user finds particularly useful.

Any combination of the above described manners of user electronically-scribing input may be made and detected. The resulting functions performed on the scribed input and not limited to the examples described herein, and any combination of one or more determined manners of scribed input may be associated with any combination of one or more functions to be performed on that scribed input. Further, any particular electronic stylus type (for example, electronic pen or mobile telephone) having any form factor or associated functionality may be used in any manner(s) to associate scribed text with any function(s).

Figure 19:
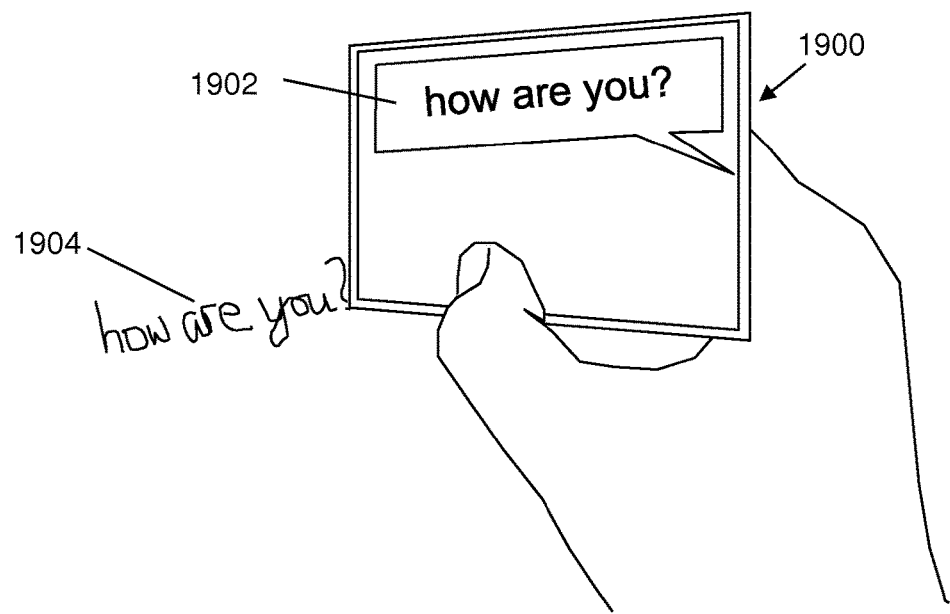
FIG. 19 illustrates user electronic-scribed input displayed on the electronic stylus used for scribing according to examples of the present disclosure.

FIG. 19 illustrates an example of an apparatus/device 1900 in use, in which the user electronic-scribed input 1904 is displayed 1902 on the electronic stylus display. In some examples, the user scribed input 1904 may be displayed 1902 on both the electronic scribing stylus 1900 and on another device to which the scribed user input is transmitted such as a display screen. In other examples the scribed user input 1904 may be displayed 1902 on a device separate to the electronic stylus 1900 and may not be displayed on the electronic stylus 1900 itself.

Figure 20A:
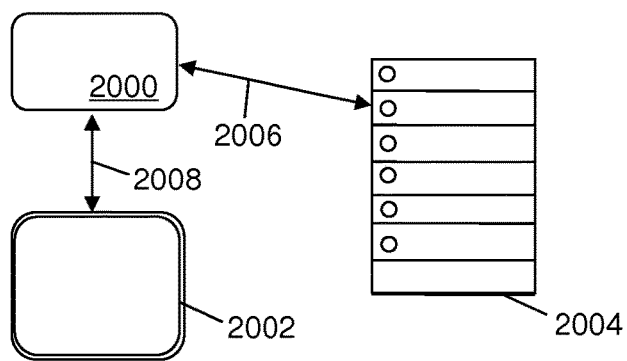
FIGS. 20a-20b each illustrate an apparatus in communication with a remote computing element.
Figure 20B:
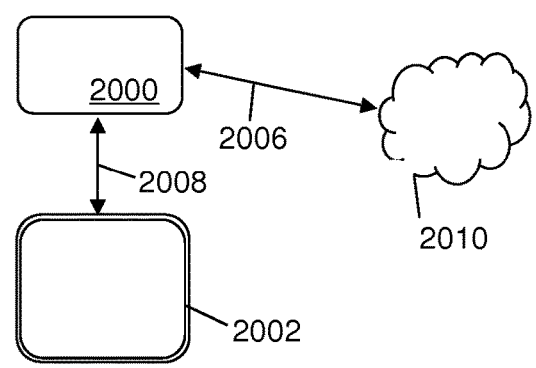

FIG. 20*a* shows an example of an apparatus 2000 in communication with a remote server. FIG. 20*b* shows an example of an apparatus 2000 in communication with a "cloud" for cloud computing. In FIGS. 20*a* and 20*b*, apparatus 2000 (which may be apparatus 100, 200 or 300 for example) is also in communication with a further apparatus 2002. The further apparatus 2002 may be a display, camera, or input sensor, for example. In other examples, the apparatus 2000 and further apparatus 2002 may both be comprised within a device such as a portable communications device smartphone, or electronic stylus, for example. Communication with each other 2000, 2002 and/or with the remote computing element 2004, 2010 may be via a communications unit, for example.

FIG. 20*a* shows the remote computing element to be a remote server 2004, with which the apparatus 2000 may be in wired or wireless communication (e.g. via the internet, Bluetooth, NFC, a USB connection, or any other suitable connection as known to one skilled in the art). In FIG. 20*b*, the apparatus 2000 is in communication with a remote cloud 2010 (which may, for example, be the Internet, or a system of remote computers configured for cloud computing). For example, the user-scribed input may be stored on a remote server or cloud. The particular remote storage medium to be used may be determined based on the manner in which input is scribed. In some examples, scribed user input may be transmitted to a remote server 2004 or cloud 2010 for processing (for example, for handwriting deciphering or for text formatting) before being made available at the same remote device 2004, 2010, at a different remote device, on a different local device and/or on the apparatus 2002, 2002. In other examples the second apparatus may also be in direct communication with the remote server 2004 or cloud 2010. The server 2004 and/or cloud 2010 may provide for the aforementioned association of the scribed input with a particular function based on appropriate received signalling.

Apparatus described herein may output the electronically scribed input. An apparatus described herein may be, for example, an electronic stylus, a wand, a portable electronic device, a mobile phone, a smartphone, a tablet computer, a surface computer, a laptop computer, a personal digital assistant, a graphics tablet, a pen-based computer, a non-portable electronic device, a desktop computer, a monitor/display, a household appliance, a server, or a module for one or more of the same.

Apparatus described herein may be an electronic stylus or may comprise an electronic stylus. For example, an electronic stylus may comprise/be an apparatus configured to associate the user electronic-scribed input with a function to be performed using the user electronic-scribed input based on one or more determined input manner characteristics of user electronic-scribed input.

Figure 21:
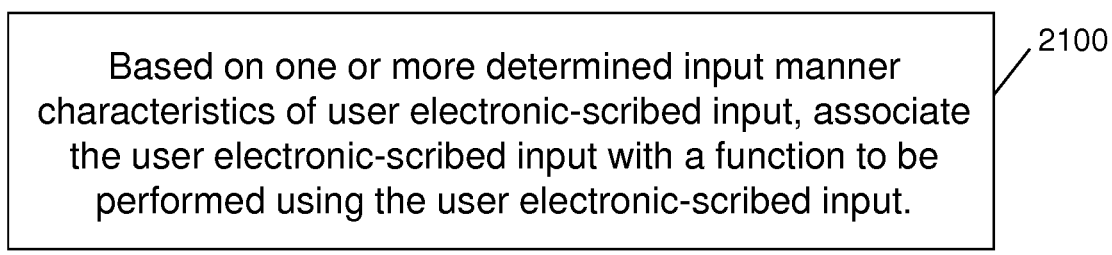
FIG. 21 illustrates a flowchart according to an example method of the present disclosure.

FIG. 21*a* illustrates a method 2100 according to an example of the present disclosure. The method comprises, based on one or more determined input manner characteristics of user electronic-scribed input, associating the user electronic-scribed input with a function to be performed using the user electronic-scribed input.

Figure 22:
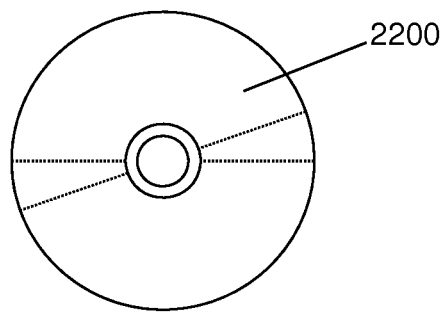
FIG. 22 illustrates schematically a computer readable medium providing a program.

FIG. 22 illustrates schematically a computer/processor readable medium 1000 providing a program according to an example. In this example, the computer/processor readable medium is a disc such as a Digital Versatile Disc (DVD) or a compact disc (CD). In other examples, the computer readable medium may be any medium that has been programmed in such a way as to carry out the functionality herein described. The computer program code may be distributed between the multiple memories of the same type, or multiple memories of a different type, such as ROM, RAM, flash, hard disk, solid state, etc.

Any mentioned apparatus/device/server and/or other features of particular mentioned apparatus/device/server may be provided by apparatus arranged such that they become configured to carry out the desired operations only when enabled, e.g. switched on, or the like. In such cases, they may not necessarily have the appropriate software loaded into the active memory in the non-enabled (e.g. switched off state) and only load the appropriate software in the enabled (e.g. on state). The apparatus may comprise hardware circuitry and/or firmware. The apparatus may comprise software loaded onto memory. Such software/computer programs may be recorded on the same memory/processor/functional units and/or on one or more memories/processors/functional units.

In some examples, a particular mentioned apparatus/device/server may be pre-programmed with the appropriate software to carry out desired operations, and wherein the appropriate software can be enabled for use by a user downloading a "key", for example, to unlock/enable the software and its associated functionality. Advantages associated with such examples can include a reduced requirement to download data when further functionality is required for a device, and this can be useful in examples where a device is perceived to have sufficient capacity to store such pre-programmed software for functionality that may not be enabled by a user.

Any mentioned apparatus/circuitry/elements/processor may have other functions in addition to the mentioned functions, and that these functions may be performed by the same apparatus/circuitry/elements/processor. One or more disclosed aspects may encompass the electronic distribution of associated computer programs and computer programs (which may be source/transport encoded) recorded on an appropriate carrier (e.g. memory, signal).

Any "computer" described herein can comprise a collection of one or more individual processors/processing elements that may or may not be located on the same circuit board, or the same region/position of a circuit board or even the same device. In some examples one or more of any mentioned processors may be distributed over a plurality of devices. The same or different processor/processing elements may perform one or more functions described herein.

The term "signalling" may refer to one or more signals transmitted as a series of transmitted and/or received electrical/optical signals. The series of signals may comprise one, two, three, four or even more individual signal components or distinct signals to make up said signalling. Some or all of these individual signals may be transmitted/received by wireless or wired communication simultaneously, in sequence, and/or such that they temporally overlap one another.

With reference to any discussion of any mentioned computer and/or processor and memory (e.g. including ROM, CD-ROM etc), these may comprise a computer processor, Application Specific Integrated Circuit (ASIC), field-programmable gate array (FPGA), and/or other hardware components that have been programmed in such a way to carry out the inventive function.

The applicant hereby discloses in isolation each individual feature described herein and any combination of two or more such features, to the extent that such features or combinations are capable of being carried out based on the present specification as a whole, in the light of the common general knowledge of a person skilled in the art, irrespective of whether such features or combinations of features solve any problems disclosed herein, and without limitation to the scope of the claims. The applicant indicates that the disclosed aspects/examples may consist of any such individual feature or combination of features. In view of the foregoing description it will be evident to a person skilled in the art that various modifications may be made within the scope of the disclosure.

While there have been shown and described and pointed out fundamental novel features as applied to examples thereof, it will be understood that various omissions and substitutions and changes in the form and details of the devices and methods described may be made by those skilled in the art without departing from the scope of the disclosure. For example, it is expressly intended that all combinations of those elements and/or method steps which perform substantially the same function in substantially the same way to achieve the same results are within the scope of the disclosure. Moreover, it should be recognized that structures and/or elements and/or method steps shown and/or described in connection with any disclosed form or examples may be incorporated in any other disclosed or described or suggested form or example as a general matter of design choice. Furthermore, in the claims means-plus-function clauses are intended to cover the structures described herein as performing the recited function and not only structural equivalents, but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

The invention claimed is:

1. An apparatus comprising:
   at least one processor; and
   at least one memory including computer program code, the at least one memory and the computer program code configured to, with the at least one processor, cause the apparatus to perform at least the following:
   receive a user electronic-scribed handwritten input;
   determine one or more input manner characteristics of the user electronic-scribed handwritten input, wherein the one or more input manner characteristic comprise at least one of (i) an input angle at which the electronic-scribed handwritten input was provided, (ii) an input plane on which the electronic-scribed handwritten input was provided, (iii) a size of the electronic-scribed handwritten input, or (iv) a speed at which the electronic-scribed handwritten input was provided;
   convert the user electronic-scribed handwritten input into electronic information;
   identify at least one of a device to which the electronic information is to be transmitted, or an application with which the electronic information is to be associated, based on the at least one of (i) the input angle relative to at least two ranges of input angles associated with respective and different devices or applications, (ii) the input plane identified from at least two of a vertical plane, a horizontal plane, an angled plane, an imaginary plane, or a physical plane, each plane being associated with respective and different devices or applications, (iii) the size of the electronic-scribed handwritten input relative to at least two ranges of sizes, each range of sizes associated with respective and different devices or applications, or (iv) the speed relative to at least two ranges of speeds, each range of speeds being associated with respective and different devices or applications; and
   perform at least one of causing transmission of the electronic information to the device identified based on the one or more determined input manner characteristics, or associating the electronic information with the application identified based on the one or more determined input manner characteristics.

2. The apparatus of claim 1, wherein the one or more input manner characteristics are determined using one or more of the following devices comprised in an electronic stylus used by a user to scribe the user electronic-scribed input:
   an accelerometer; a gyroscope; a proximity sensor; a trackball; an optical camera; an infra-red camera; a microphone; or a pressure sensor.

3. The apparatus of claim 1, wherein the at least one memory and the computer program code are further configured to, with the at least one processor:
   identify the application based on the one or more input manner characteristics; and
   include the electronic information in one or more of: an e-mail; an SMS message; an MMS message; a chat message; a word processing document; an electronic note; a drawing; a spreadsheet; a database; a search field; a web address; or a social media post.

4. The apparatus of claim 1, wherein the at least one memory and the computer program code are further configured to, with the at least one processor:

identify the application based on the one or more input manner characteristics; and provide the electronic information in an entry field of the application, the entry field comprising one or more of: a search; a web address field; a social media post field, or a data input field.

5. The apparatus of claim 1, wherein the at least one memory and the computer program code are further configured to, with the at least one processor:

identify the application based on the one or more input manner characteristics, wherein the application comprises one or more of:

an e-mail application type;
a productivity application type;
a messaging application type;
a calendar application type;
a web browsing application type;
a social media application type; or
a searching application type.

6. The apparatus of claim 1, wherein the apparatus is one or more of: an electronic stylus, a wand, a portable electronic device, a mobile phone, a smartphone, a tablet computer, a surface computer, a laptop computer, a personal digital assistant, a graphics tablet, a pen-based computer, a non-portable electronic device, a desktop computer, a monitor/display, a household appliance, a server, or a module for one or more of the same.

7. A non-transitory computer readable medium comprising computer program code stored thereon, the computer readable medium and computer program code being configured to, when run on at least one processor perform at least the following:

receive a user electronic-scribed handwritten input;

determine one or more input manner characteristics of the user electronic-scribed handwritten input, wherein the one or more input manner characteristics comprise at least one of (i) an input angle at which the electronic-scribed handwritten input was provided, (ii) an input plane on which the electronic-scribed handwritten input was provided, (iii) a size of the electronic-scribed handwritten input, or (iv) a speed at which the electronic-scribed handwritten input was provided;

convert the user electronic-scribed handwritten input into electronic information;

identify at least one of a device to which the electronic information is to be transmitted, or an application with which the electronic information is to be associated, based on the at least one of (i) the input angle relative to at least two ranges of input angles associated with respective and different devices or applications, (ii) the input plane identified from at least two of a vertical plane, a horizontal plane, an angled plane, an imaginary plane, or a physical plane, each plane being associated with respective and different devices or applications, (iii) the size of the electronic-scribed handwritten input relative to at least two ranges of sizes, each range of sizes associated with respective and different devices or applications, or (iv) the speed relative to at least two ranges of speeds, each range of speeds being associated with respective and different devices or applications; and perform at least one of causing transmission of the electronic information to the device identified based on the one or more determined input manner characteristics, or associating the electronic information with the application identified based on the one or more determined input manner characteristics.

8. A method comprising:

receiving a user electronic-scribed handwritten input;

determining one or more input manner characteristics of the user electronic-scribed handwritten input, wherein the one or more input manner characteristics comprise at least one of (i) an input angle at which the electronic-scribed handwritten input was provided, (ii) an input plane on which the electronic-scribed handwritten input was provided, (iii) a size of the electronic-scribed handwritten input, or (iv) a speed at which the electronic-scribed handwritten input was provided;

converting the user electronic-scribed handwritten input into electronic information;

identifying at least one of a device to which the electronic information is to be transmitted, or an application with which the electronic information is to be associated, based on the at least one of (i) the input angle relative to at least two ranges of input angles associated with respective and different devices or applications, (ii) the input plane identified from at least two of a vertical plane, a horizontal plane, an angled plane, an imaginary plane, or a physical plane, each plane being associated with respective and different devices or applications, (iii) the size of the electronic-scribed handwritten input relative to at least two ranges of sizes, each range of sizes associated with respective and different devices or applications, or (iv) the speed relative to at least two ranges of speeds, each range of speeds being associated with respective and different devices or applications; and performing at least one of causing transmission of the electronic information to the device identified based on the one or more determined input manner characteristics, or associating the electronic information with the application identified based on the one or more determined input manner characteristics.

* * * * *

UNITED STATES PATENT AND TRADEMARK OFFICE
CERTIFICATE OF CORRECTION

PATENT NO. : 11,269,431 B2
APPLICATION NO. : 14/899814
DATED : March 8, 2022
INVENTOR(S) : Xiaoping Li et al.

It is certified that error appears in the above-identified patent and that said Letters Patent is hereby corrected as shown below:

In the Claims

In Column 22, Line 22, Claim 1, delete "characteristic" and insert -- characteristics --, therefor.

Signed and Sealed this
Seventh Day of March, 2023

Katherine Kelly Vidal
*Director of the United States Patent and Trademark Office*